US012189697B2

(12) United States Patent
Liu et al.

(10) Patent No.: US 12,189,697 B2
(45) Date of Patent: Jan. 7, 2025

(54) INFORMATIONAL GROUNDING WITH RESPECT TO A GENERATIVE MODEL

(71) Applicant: Microsoft Technology Licensing, LLC, Redmond, WA (US)

(72) Inventors: Zhun Liu, Redmond, WA (US); Saksham Singhal, Redmond, WA (US); Xia Song, Redmond, WA (US); Rahul Lal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/335,983

(22) Filed: Jun. 15, 2023

(65) Prior Publication Data
US 2024/0256615 A1    Aug. 1, 2024

Related U.S. Application Data

(60) Provisional application No. 63/442,447, filed on Jan. 31, 2023.

(51) Int. Cl.
*G06F 16/9532* (2019.01)
*G06F 16/954* (2019.01)

(52) U.S. Cl.
CPC ........ *G06F 16/9532* (2019.01); *G06F 16/954* (2019.01)

(58) Field of Classification Search
CPC .......... G06N 3/02; G06N 5/022; G06N 20/00; G06N 3/094; G06F 40/30; G06F 16/9538; G06F 16/3329
See application file for complete search history.

(56) References Cited

U.S. PATENT DOCUMENTS

2020/0042642 A1    2/2020  Bakis et al.
2023/0244934 A1*   8/2023  Lazaridou ................ G06N 3/08
                                                      706/25
(Continued)

OTHER PUBLICATIONS

Show HN: Web search using a ChatGPT-like model that can cite its sources (sayhello.so) written by rushingscreek, Dec. 8, 2022 (Year: 2022).*

(Continued)

*Primary Examiner* — Hau H Hoang
(74) *Attorney, Agent, or Firm* — CALFEE, HALTER & GRISWOLD LLP

(57) ABSTRACT

A computing system is disclosed that includes a processor and memory. The memory stores instructions that, when executed by the processor, cause the processor to perform several acts. The acts include receiving, by a generative model, input set forth by a user of a client computing device that is in network communication with the computing system. The acts also include generating, by the generative model, a query based upon the input set forth by the user; providing the query to a search engine. The acts further include receiving, by the generative model and from the search engine, content identified by the search engine based upon the query. The acts additionally include generating, by the generative model, an output based upon a prompt, where the prompt includes the content identified by the search engine based upon the query. The acts also include transmitting the output to the client computing device for presentment to the user.

19 Claims, 13 Drawing Sheets

(56) References Cited

U.S. PATENT DOCUMENTS

2023/0260164 A1* 8/2023 Yuan .................. G06N 20/00
                                              382/157
2024/0070492 A1* 2/2024 Zhang .................. G06N 5/04

OTHER PUBLICATIONS

International Search Report and Written Opinion received for PCT Application No. PCT/US24/10976, Apr. 29, 2024, 12 pages.

* cited by examiner

INFORMATIONAL GROUNDING WITH RESPECT TO A GENERATIVE MODEL

RELATED APPLICATION

This application claims priority to U.S. Provisional Patent Application No. 63/442,447, filed on Jan. 31, 2023, and entitled "INFORMATIONAL GROUNDING WITH RESPECT TO A GENERATIVE LANGUAGE MODEL", the entirety of which is incorporated herein by reference.

BACKGROUND

A conventional computer-implemented search engine is configured to receive a search query and infer an information retrieval intent of a user who issued the query (for example, ascertain whether the user wants to navigate to a specific page, whether the user intends to purchase an item or service, whether the user is looking for a fact, whether the user is searching for an image or video, etc.). The search engine identifies results based upon the inferred information retrieval intent and returns a search engine results page (SERP) to a computing device employed by the user. The SERP can include a link to a webpage, a snippet of text extracted from the webpage, an image, a video (or a link to a video), a knowledge card (a graphical item that includes information about an entity such as a person, place, company, etc.), an instant answer (a graphical item that depicts an answer to a question set forth in the query), a widget (such as a graphical calculator that can be interacted with by the user), supplemental content (e.g., advertisements that are related to the query), and so forth.

While search engines are frequently updated with features that are designed to improve user experience (and to provide increasingly relevant results to users), search engines are not well-equipped to provide certain types of information. For example, search engines are not configured to provide output that requires reasoning over content of a webpage or output that is based upon several different information sources. For instance, upon receipt of a query "how many home runs did Babe Ruth hit before he turned 30" from a user, a conventional search engine returns a knowledge card about Babe Ruth (which may depict an image of Babe Ruth, a birthdate of Babe Ruth, etc.), suggested alternate queries (such as "how many hits did Babe Ruth have in his career?"), links to webpages that include statistics, amongst other information. To obtain the answer to the question in the query, the user must access a webpage that includes statistics and compute the answer themselves.

In another example, upon receipt of a query "provide me with a list of famous people born in Seattle and Chicago", a conventional search engine returns knowledge cards about the cities Chicago and Seattle, a link to a first webpage that includes a list of people from Chicago, and a link to a second webpage that includes a list of people from Seattle. The search engine, however, is unable to reason over content of the two webpages to produce a list that includes identities of people from both Chicago and Seattle.

Relatively recently, generative models, including generative language models (GLMs) (also referred to as large language models (LLMs)) have been developed. An example of a GLM is the Generative Pre-trained Transformer 3 (GPT-3). Another example of a GLM is the BigScience Language Open-science Open-access Multilingual (BLOOM) model, which is also a transformer-based model. Briefly, a generative model is configured to generate an output (such as text in human language, source code, music, video, and the like) based upon a prompt set forth by a user and in near real-time (e.g., within a few seconds of receiving the prompt). The generative model generates content based upon training data over which the generative model has been trained. Accordingly, in response to receiving a prompt that includes the query "how many home runs did Babe Ruth hit before he turned 30", the generative model can output "Before he turned 30, Babe Ruth hit 94 home runs." In another example, in response to receiving a prompt that includes the query "provide me with a list of famous people born in Seattle and Chicago", the generative model can output two separate lists of people (one for Seattle and one for Chicago), where the list of people born in Chicago includes Barrack Obama. In both these examples, however, the generative model outputs information that is incorrect— for instance, Babe Ruth hit more than 94 home runs before he turned 30, and Barrack Obama was born in Hawaii (and not Chicago). Accordingly, both conventional search engines and generative models are deficient with respect to identifying and/or generating appropriate information in response to certain types of user input. Moreover, conventional generative models are not well-suited to generate responses with respect to input that is based in time, particularly recent time. For instance, a conventional generative model is not well-suited to generate a meaningful response to the input "what is the weather", as the generative model generates output based solely upon training data, and it is impractical to retrain the generative model every hour (or minute) to get the latest weather, sports scores, news events, etc.

SUMMARY

The following is a brief summary of subject matter that is described in greater detail herein. This summary is not intended to be limiting as to the scope of the claims.

Various technologies are described herein that relate to providing a generative model with information obtained by a search engine or information from an electronic page (such as a webpage) being viewed by a user for the generative model to use when outputting information based upon user input. Information that is used by the generative model to generate output is referred to as a prompt. In accordance with technologies described herein, the prompt used by the generative model to generate output can include: 1) user input, such as a query; and 2) information from an electronic page being viewed by the user or information retrieved by a search engine. The prompt can also include previous dialog turns, as will be described in greater detail herein.

In a first example, a browser of a client computing device loads a webpage that is configured to receive a query (e.g., by way of text, voice, or the like), such as a search engine webpage, and the browser receives a query set forth by a user of the client computing device. The browser transmits the query to a computing system that executes a search engine, and the search engine identifies search results (and optionally generates a search engine results page (SERP)) based upon the query. The search results can include webpages related to the query, a knowledge card, an instant answer, supplemental content, and so forth. The search engine may return the SERP to the browser, whereupon the SERP can be displayed on a display of the client computing device. In addition, the search engine can provide at least some of the information identified by the search engine to the generative model; the search engine can provide such information to the generative model immediately upon identifying the search results or in response to receipt of an indication that the user is requesting to interact with the generative model. In an example, the prompt used by the generative model to generate output can include the query and the information identified by the search engine; the generative model can then generate output based upon the prompt. The generative model uses the additional context to provide relevant output and to further provide output that has a higher likelihood of being factually correct when compared with the generative model being provided with only the query.

In an example, the search engine receives the input "how many home runs did Babe Ruth hit before he turned 30", and search results identified by the search engine include the birthdate of Babe Ruth and statistics for Babe Ruth by season. The generative model obtains such information as part of the prompt along with the aforementioned input. Because the prompt includes season by season home run totals for Babe Ruth, the generative model reasons over such data and provides output that is based upon the information identified as being relevant to the user input by the search engine. Accordingly, the generative model can output "Babe Ruth hit 342 home runs before he turned 30."

The generative model is additionally able to generate queries and provide the queries to the search engine, whereupon the search engine identifies search results based upon the queries and provides information based upon the search results to the generative model for inclusion in a prompt. Thus, for instance, the generative model generates a query (based upon received user input) and provides the search engine with the generated query, and the search engine identifies additional content based upon the query generated by the generative model. The additional content can be included as part of the prompt used by the generative model to generate output. Continuing with the example set forth above, subsequent to generating and outputting "Babe Ruth had 342 home runs before he turned 30", the generative model receives the user input "What about Hank Aaron?" Based upon the dialog with the user, the generative model can generate the query "how many home runs did Hank Aaron hit before he turned 30" and provide such query to the search engine. The search engine identifies content based upon the query and at least some of such content is included as part of the prompt for the generative model. The content identified by the search engine may include a birthdate of Hank Aaron as well as year-by-year statistics for Hank Aaron. Accordingly, the generative model can generate output based upon the content identified by the search engine as well as the user query and/or the query generated by the generative model. Because search engines have been developed for many years to obtain relevant and accurate information based upon queries, the likelihood of the generative model generating relevant and factually accurate output is increased compared to when the generative model generates output based solely upon user input. Further, the generative model can ascertain that more information is needed and can create another follow-up query; in an example, if search results returned by the search engine fail to include the birth year of Hank Aaron, the generative model can generate the query "Hank Aaron birth year", and the search engine can perform a search based upon such query and provide the generative model with results from the search.

In another example, a browser executing on the client device can load a webpage, such as an email webpage or other webpage that includes content. The browser is integrated with the generative model, such that a user of the client device can interact with the generative model while viewing the webpage (e.g., as a slide-out or through some other interaction). The browser provides the generative model with information on the webpage as at least a portion of a prompt. For example, the webpage can be an email webpage that includes an email that describes company benefits. The browser provides the generative model with at least a portion of the email as part of a prompt, and the generative model can receive a query (either before or after receiving the email information) related to content of the email, such as "what is my deductible for next year?" The generative model generates human-comprehensible output (such as text, an image, video) that is based upon content of the email and the query, such that the generative model provides the user with the requested information. In an example, the generative model can receive a subsequent query, such as "what is the average deductible?" and based upon such query the generative model generates a query that is well-suited for use by the search engine to obtain results that are relevant. For instance, the generative model generates the query "average deductible amount for calendar year 2024" and transmits the generated query to the search engine. The search engine identifies information based upon the query (such as an instant answer that provides the information requested in the query) and provides such information to the generative model as part of a prompt used by the generative model to generate output. Accordingly, based upon the user query and/or the query generated by the generative model, and further based upon the information provided to the generative model by the search engine, the generative model generates an output, such as "the average deductible for 2024 is $3,500". While examples set forth above have pertained to web search and search over content in a browser, it is to be understood that the technologies described herein are applicable in other scenarios, such as searching over computer-implemented documents, searching over a database of flights, and so forth.

The technologies described herein exhibit various advantages over conventional search engine and/or generative model technologies. Specifically, through integration with a generative model, a search engine is able to provide information to end users that conventional search engines are unable to provide. In addition, the generative model described herein is provided with information obtained by the search engine to use when generating outputs, thereby reducing the likelihood of the generative model issuing factually incorrect or irrelevant output. Further, the generative model can identify sources of information used to generate the output, thereby allowing the user to relatively easily fact-check the output of the generative model.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
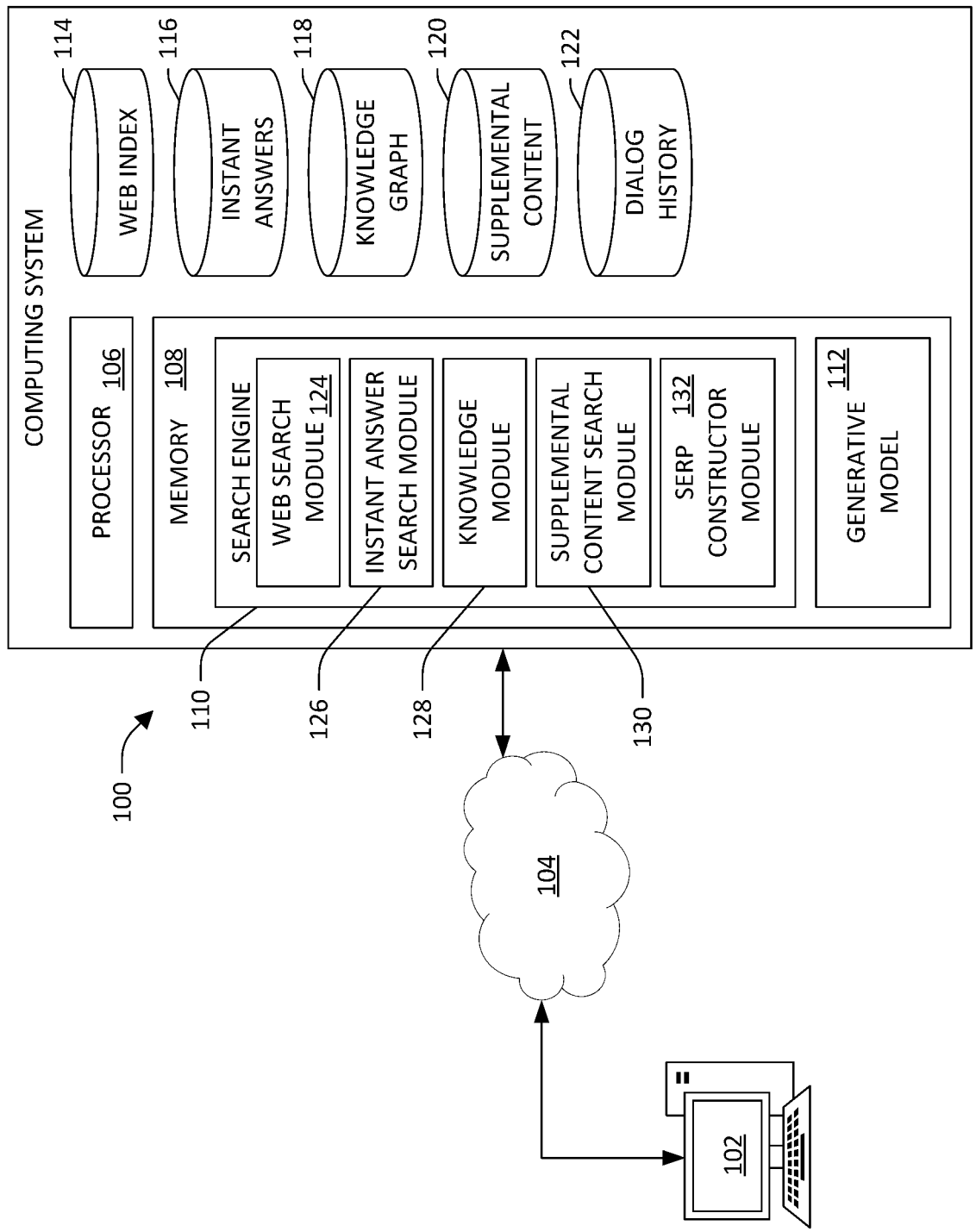
FIG. 1 is a functional block diagram of a computing system that facilitates interaction between a search engine and a generative model.

Various technologies pertaining to providing content retrieved by a search engine and/or content obtained by a web browser as a part of a prompt to a generative model are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", "engine", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

The technologies described herein are related to "grounding" a generative model with information that is usable by the generative model to generate output. Grounding the generative model refers to providing the generative model with context that is usable by the generative model to generate output, where the context is in addition to user-generated input. With more specificity, a generative model generates output based upon a prompt; conventionally, the prompt includes input generated by a user who is interacting with the generative model during a conversation (such as a query set forth by a user), previous inputs set forth by the user during the conversation, previous outputs generated by the generative model during the conversation, and previously defined instructions that describe how the generative model is to generate output. The technologies described herein relate to inclusion of additional information in the prompt, where such additional information can be obtained from a search engine (based upon a query generated by a user and/or based upon a query generated by the search engine). In another example, the additional information can be obtained from a web browser (or other application) that has loaded a webpage being viewed by a user. The generative model generates output based upon this additional information in the prompt, which leads to an increase in likelihood that the output generated by the generative model is factually accurate and/or based upon content being viewed by the user.

Referring now to FIG. 1, a functional block diagram of a computing system 100 is illustrated. While illustrated as a single system, it is to be understood that the computing system 100 can include several server computing devices, can be distributed across data centers, etc. The computing system 100 is configured to obtain information based upon a query set forth by a user and is further configured to provide the obtained information as a portion of a prompt to a generative model.

A client computing device 102 operated by a user (not shown) is in communication with the computing system 100 by way of a network 104. The client computing device 102 can be any suitable type of client computing device, such as a desktop computer, a laptop computer, a tablet (slate) computing device, a video game system, a virtual reality or augmented reality computing system, a mobile telephone, a smart speaker, or other suitable computing device.

The computing system 100 includes a processor 106 and memory 108, where the memory 108 includes instructions that are executed by the processor 106. More specifically, the memory 108 includes a search engine 110 and a generative model 112, where operations of the search engine 110 and the generative model 112 are described in greater detail below. In an example, the generative model 112 is a generative language model (GLM), although it is to be understood that the generative model 112 can output images, video, etc. The computing system 106 also includes data stores 114-122, where the data stores 114-122 store data that is accessed by the search engine 110 and/or the generative model 112. With more particularity, the data stores 114-122 include a web index data store 114, an instant answers data store 116, a knowledge graph data store 118, a supplemental content data store 120, and a dialog history data store 122.

The web index data store 114 includes a web index that indexes webpages by keywords included in or associated with the webpages. The instant answers data store 116 includes an index of instant answers that are indexed by queries, query terms, and/or terms that are semantically similar or equivalent to the queries and/or query terms. For example, the instant answer "2.16 meters" can be indexed by the query "height of Shaquille O'Neal" (and queries that are semantically similar or equivalent, such as "how tall is Shaquille O'Neal").

The knowledge graph data store 118 includes a knowledge graph, where a knowledge graph includes data structures about entities (people, places, things, etc.) and their relationships to one another, thereby representing relationships between the entities. The search engine 110 can use the knowledge graph in connection with presenting entity cards on a search engine results page (SERP). The supplemental content data store 120 includes supplemental content, such as electronic advertisements, that can be returned by the search engine 110 based upon a query.

The dialog history data store 122 includes dialog history, where the dialog history includes dialog information with respect to users and the generative model 112. For instance, the dialog history can include, for a user, identities of conversations undertaken between the user and the generative model 112, input provided to the generative model 112 by the user for multiple dialog turns during the conversation, dialog turns in the conversation generated by the generative model 112 in response to the inputs from the user, queries generated by the generative model 112 during the conversation that are used by the generative model 112 to generate responses, and so forth. In addition, the dialog history can include context obtained by the search engine 110 during conversations; for instance, with respect to a conversation, the dialog history 122 can include content from search results identified based upon queries set forth by the user and/or the generative model 112 during the conversation, content from webpages identified by the search engine 110 based upon queries set forth by the user and/or the generative model 112 during the conversation, and so forth. The data stores 114-122 are presented to show a representative sample of types of data that are accessible to the search engine 110 and/or the generative model 112; it is to be understood that there are many other sources of data that are accessible to the search engine 110 and/or the generative model 112, such as data stores that include real-time finance information, data stores that include real-time weather information, data stores that include real-time sports information, data stores that include images, data stores that include videos, data stores that include maps, etc. Such sources of information are available to the search engine 110 and/or the generative model 112.

The search engine 110 includes a web search module 124, an instant answer search module 125, a knowledge module 128, a supplemental content search module 130, and a SERP constructor module 132. The web search module 124 is configured to search the web index data store 114 based upon queries received by users, queries generated by the search engine 110 based upon queries received by users, and/or queries generated by the generative model 112 based upon interactions of users with the generative model 112. Similarly, the instant answer search module 126 is configured to search the instant answers data store 116 based upon queries received by users, queries generated by the search engine 110 based upon queries received by users, and/or queries generated by the generative model 112 based upon interactions of users with the generative model 112. The knowledge module 128 is configured to search the knowledge graph data store 118 based upon queries received by users, queries generated by the search engine 110 based upon queries received by users, and/or queries generated by the generative model 112 based upon interactions of users with the generative model 112. Likewise, the supplemental content search module 130 is configured to search the supplemental content data store 120 based upon queries received by users, queries generated by the search engine 110 based upon queries received by users, and/or queries generated by the generative model 112 based upon interactions of users with the generative model 112.

The SERP constructor module 132 is configured to construct SERPs based upon information identified by searches performed by the modules 124-130; for instance, a SERP can include links to webpages identified by the web search module 124, an instant answer identified by the instant answer search module 126, an entity card (that includes information about an entity) identified by the knowledge module 128, and supplemental content identified by the supplemental content search module 130. Further, a SERP may include a widget, a card that depicts current weather, and the like. The SERP constructor module 132 can also generate structured, semi-structured, and/or unstructured data that is representative of content of the SERP or a portion of the content of the SERP. For instance, the SERP constructor module 132 generates a JSON document that includes information obtained by the search engine 110 based upon one or more searches performed over the data stores 114-120 (or other data stores). In an example, the SERP constructor module 132 generates data that is in a structure/format to be used as a portion of a prompt by the generative model 112.

As discussed above, operation of the search engine 110 is improved through use of the generative model 112, and operation of the generative model 112 is improved through use of the search engine 110. For instance, the search engine 110 is able to provide outputs that the search engine 110 was not previously able to provide (e.g., based upon outputs generated by the generative model 112), and the generative model 112 is improved by using information obtained by the search engine 110 to generate outputs (e.g., information identified by the search engine 110 can be included as a portion of a prompt used by the generative model 112 to generate outputs). Specifically, the generative model 112 generates outputs based upon information obtained by the search engine 110, and accordingly the outputs have a higher likelihood of being accurate when compared to outputs generated by generative models that are not based upon such information, as the search engine 110 is associated with years of development in connection with curating information sources to ensure accuracy thereof.

Figure 2:
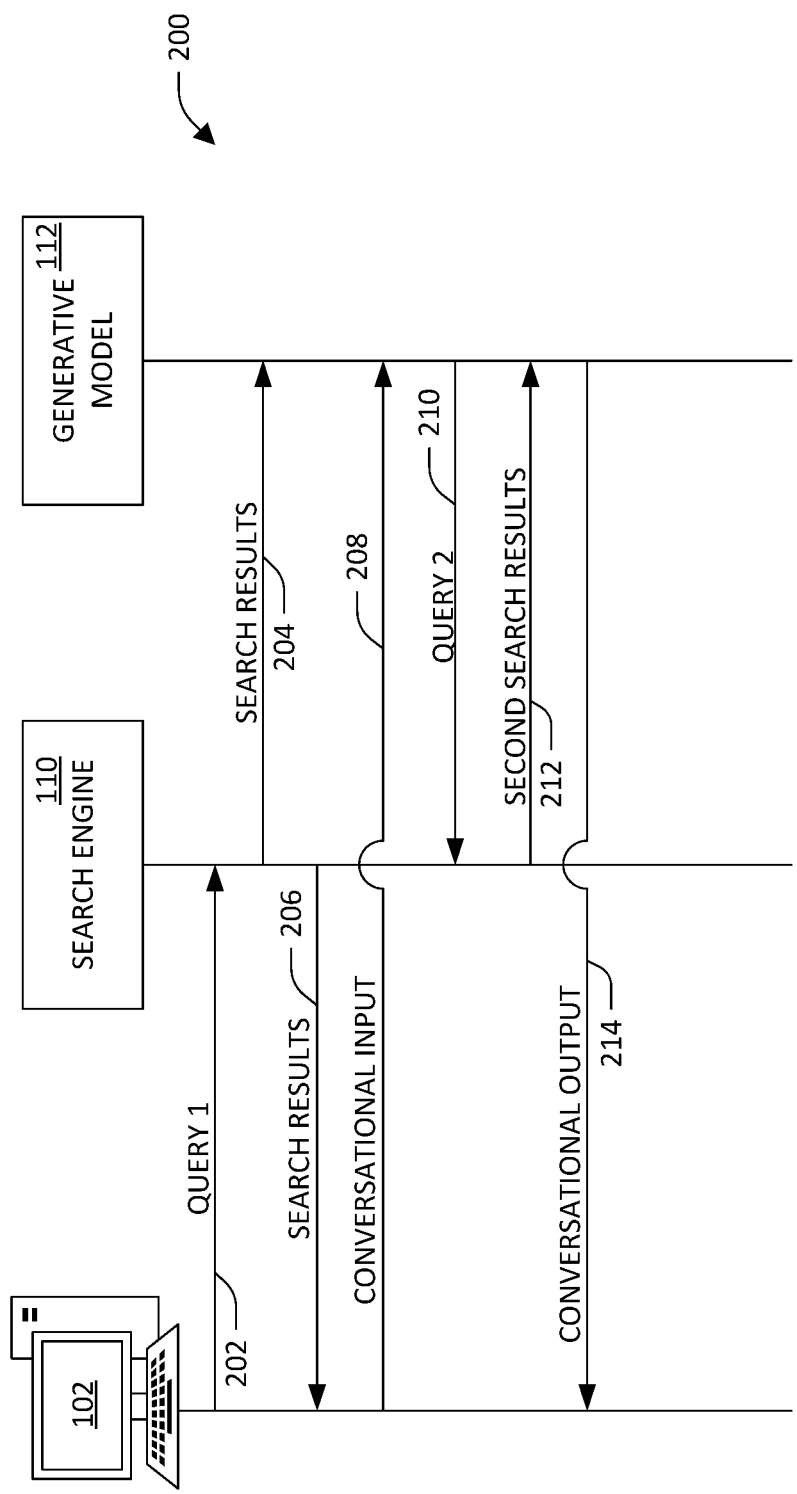
FIG. 2 is a communications flow diagram that illustrates an example flow of communications between a client computing device, a search engine, and a generative model.

Examples of operation of the computing system 100 are now set forth. It is to be understood that these examples are non-limiting, and that permutations of such examples are contemplated. Referring to FIG. 2, a communications diagram 200 depicting communications between the client computing device 102, the search engine 110, and the generative model 112 in accordance with a first example is presented. The client computing device 102 is executing an application such as a web browser, and the application receives a query (user input) that is to be transmitted to the search engine 110 executing at the computing system 100. For instance, the web browser can load a homepage of the search engine and the web browser receives a query from a user in a text entry field. In another example, the web browser can receive a query in an address field of the web browser. In yet another example, the webpage can be associated with the generative model 112 (e.g., a user can access the generative model 112 directly rather than through a search engine interface). At 202, the client computing device 102 transmits the query to the search engine 110. Alternatively, the client computing device 102 transmits the query to the generative model 112, which forwards the query to the search engine 110.

The search engine 110 performs at least one search over at least one of the data stores 114-122 based upon the query and identifies search results. As indicated previously, the search results can include identities of webpages, an instant answer, a widget, supplemental content, an entity card, and the like. In an example, the search engine 110 can construct several queries based upon the query, the location of the client computing device 102, a profile of the user of the client computing device 102, etc., and can search over the data stores using queries identified by the search engine 110 as being well-suited for use when searching over such data stores 114-120.

At 204, the search engine 110 provides the search results (or a portion thereof) to the generative model 112. In an example, the search engine 110 provides the generative model 112 with search information that the search engine 110 has identified as being relatively highly likely to be relevant to the user (e.g., information from an entity card, information pertaining to a threshold number of most highly ranked webpages, etc.). In a more specific example, the search engine provides the generative model 112 with information according to a predefined priority level: 1) when the search engine identifies an instant answer, entity card, or the like, the search engine provides information in the instant answer, the entity card, or the like to the generative model; 2) for a top threshold number of most highly ranked webpages (e.g., the three most highly ranked webpages), the search engine 110 provides the URL for such webpages, titles of such webpages, and content extracted from such webpages based upon the query to the generative model 112. The content extracted from the webpages can be or include a snippet that is extracted from a webpage by the search engine (where the snippet is displayed with a link to the webpage in the search results page). In another example, the content extracted from the webpages can be portions of such webpages that are identified by the search engine 110 as being most relevant portions with respect to the input query.

Optionally, at 206, the search engine 110 returns the search results (or a portion thereof) to the client computing device 102, whereupon the search results are presented to the user. While the communications diagram 200 depicts the search information being provided to the generative model 112 before the search results are provided to the client computing device 102, it is to be understood that the search engine 110 can provide the search results to the client computing device 102 prior to providing the search information to the generative model 112. In addition, the search engine 110 may refrain from providing the search information to the generative model 112 until further user input is received (e.g., indicating that the user intends to interact with the GLM 112).

The client computing device 102 receives an indication that the user thereof intends to interact with the generative model 112. For example, the SERP can include a selectable interactive element that initiates a conversation with the generative model 112. In another example, an interface by way of which the user of the client computing device 102 can interact with the generative model 112 can be initiated on the SERP by way of a gesture (e.g., an upward or downward scroll). The client computing device 102 receives (conversational) input from the user that is to be provided to the generative model 112 as part of a prompt, and at 208 the input is provided to the generative model 112. While FIG. 2 indicates that the input is provided directly from the client computing device 102 to the generative model 112, in an example the client computing device 102 (the web browser executing on the client computing device 102) transmits the input to the search engine 110, which then forwards the input to the generative model 112. Further, if not provided previously, the search engine 110 can transmit the search information (shown as being transmitted at 204) to the generative model 112 after receiving an indication that a conversation with the generative model 112 has been initiated.

Optionally, the generative model 112 generates a second query that is well-suited for use by the search engine 110 in connection with identifying further search results that are relevant to the input, where the generative model 112 generates the second query based upon the search information received at 204 and the input received at 208. Thus, in contrast to conventional approaches, the generative model 112 generates the second query based not only upon the input, but generates the second query based further upon search results identified by the search engine 110. In another example, the generative model 112 generates a query based solely upon the input. The generative model 112 can query the search engine upon predicting that additional information is desired in connection with providing a useful response to the user; for instance, the generative model 112 can predict that information that the generative model 112 has available to generate output is stale, and can query the search engine after predicting that the information is stale. At 210, the second query generated by the generative model 112 is provided to the search engine 110, and the search engine 110 searches over at least one of the data stores 114-120 based upon the second query. The search engine 110 identifies second search results based upon the second query and provides information extracted from the second search results as second search information to the generative model 112 at 212, where the second search information is included in a prompt for the generative model 112.

The generative model 112 generates output based upon the search information obtained at 204 and the input obtained at 208. In addition, optionally, the generative model 112 generates the output based upon the second search information obtained at 212. Again, this is contrary to conventional approaches, where generative models generate output based solely upon input set forth by the user, conversation history (when available), and predefined instructions. The generative model 112 transmits the output to the client computing device 102 at 214 (optionally by way of the search engine 110).

The generative model 112 generates output based upon the search information provided thereto at 204 and the input transmitted to the generative model 112 at 208. Thus, the prompt employed by the generative model 112 to generate the output includes the search information provided to the generative model 112 by the search engine 110 at 204 and the input received from the client computing device 102 at 208. The generative model 112 outputs the output, and the output is provided to the client computing device 102 for presentment to the user thereof. Moreover, the generative model can include citations to sources used by the generative model to generate the output. Thus, when the generative model is 112 provided with content from a webpage by the search engine 110 and generates output based upon such content, the generative model 112 can include a citation to the webpage in the output, thereby informing the user of source of the output generated by the generative model 112.

This process can repeat as the generative model 112 receives additional inputs from the user of the client computing device 102. For instance, the generative model 112 may receive second input from the client computing device 102; upon receipt of such input, the generative model 112 can construct a third query, where the generative model 112 constructs the third query based upon: 1) the query initially obtained by the search engine 110 at 202; 2) at least some search results identified by the search engine 110 based upon the query; 3) the input obtained at 208; 4) the second query generated by the generative model 112; 4) the second search results generated by the search engine 110; 5) the output generated by the generative model 112 and provided to the client computing device 102 at 214; and 6) the second input received from the user. The generative model 112 provides the third query to the search engine 110, which performs another search based upon the third query and identifies third search results. Information extracted from the third search results are provided to the generative model 112, which uses such information to generate second output.

While the examples referenced above have referred to the generative model 112 generating text, it is understood that the generative model 112 can generate images or other multimedia; further, the generative model 112 can request that the search engine 110 perform visual searches (e.g., provide the search engine 110 with an image and request that the search engine 110 identify similar images).

Moreover, in another example, the generative model 112 can initially receive input (rather than the search engine 110 initially receiving the query at 202). In such an embodiment, the generative model 112 provides the input to the search engine 110 and/or generates a query based upon the input and provides the query to the search engine 110. The search engine 110 identifies search results based upon the input and/or the query and provides at least a portion of the search results to the generative model 112 as search information, where the search information is included in a prompt for the generative model 112. The generative model 112 can then generate the output; therefore, the search results need not be directly provided to the user and the user can initially set forth the query to the generative model 112 (rather than initially setting forth the query to a search engine home page or other entry page associated with a search engine).

Figure 3:
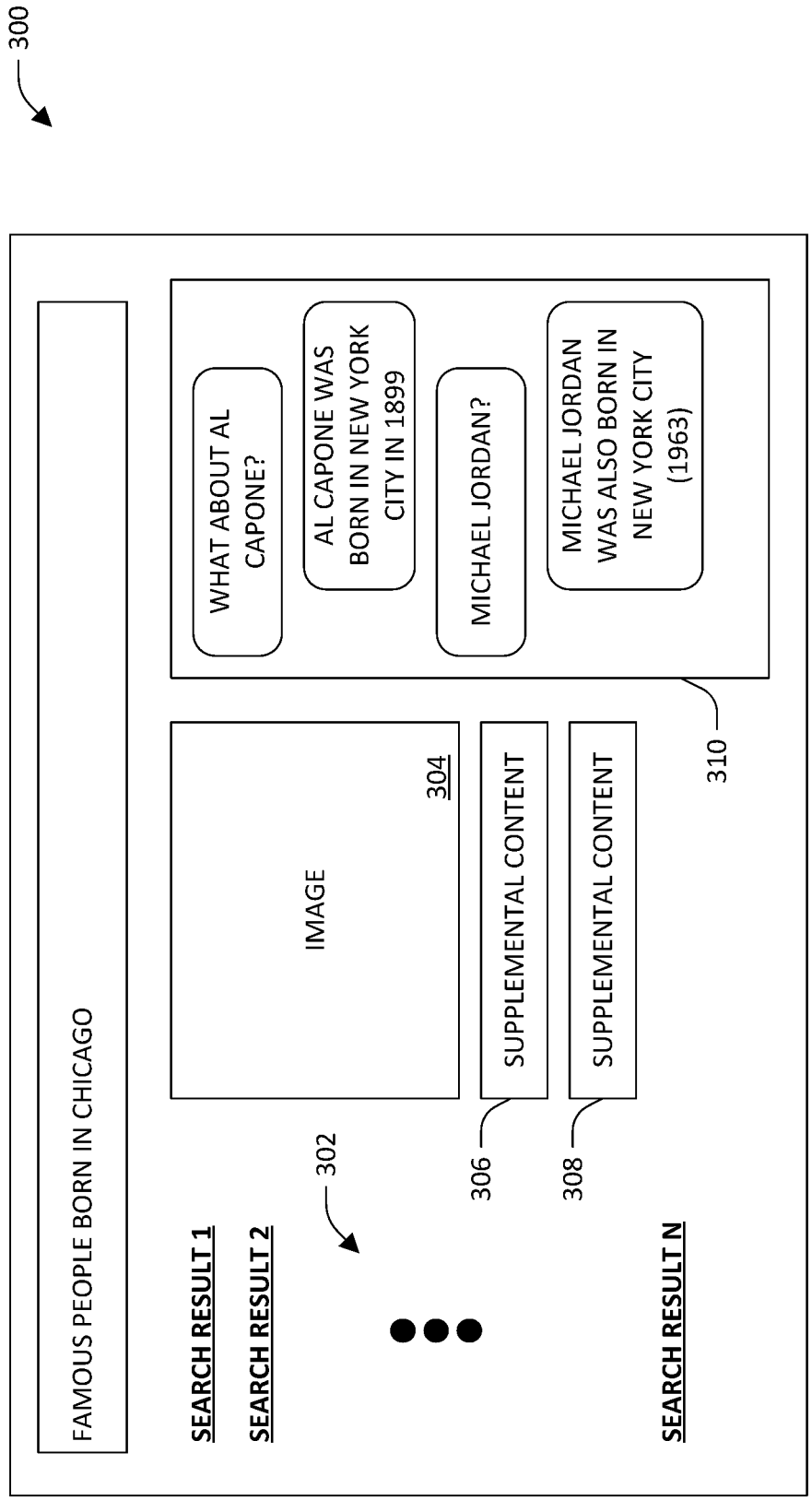
FIG. 3 depicts a graphical user interface (GUI) of a search engine that includes search results and an interface by way of which communications are provided to and received from a generative model.

Turning now to FIG. 3, a graphical user interface (GUI) 300 of a SERP that depicts interaction between the search engine 110 and the generative model 112 in accordance with the communications diagram 200 of FIG. 2 is presented. As illustrated in FIG. 3, the client computing device 102 has received the query "famous people born in Chicago" from the user and has transmitted the query to the search engine 110. The search engine 110 searches at least one of the data stores 114-120 based upon the query, and the SERP constructor module 132 constructs the SERP depicted in FIG. 3, where the SERP includes a list of links 302 that point to webpages identified by the search engine 110 as being relevant to the query, an image 304 identified by the search engine 110 as being relevant to the query, supplemental content 306 and 308 identified as being relevant to the query, and so forth.

The client computing device 102 receives an indication from the user that a conversation is to be initiated with the generative model 112 (e.g., the user can select a button or the like), resulting in an interface 310 being presented that is configured to receive (conversational) inputs and display (conversational) outputs. The client computing device 102 then receives the input "What about Al Capone?", and the query is provided to the generative model 112 (directly from the client computing device 102 or by way of the search engine 110). The generative model 112 is further provided with at least some information from the search results identified by the search engine 110 as being relevant to the aforementioned query. In addition, and optionally, the generative model 112 generates a second query based upon: 1) the input; 2) the search results identified by the search engine 110; and/or 3) the original query received by the search engine 110. For instance, the GLM 112 generates the query "birthplace of Al Capone" and provides such query to the search engine 110. The search engine 110 conducts a search based upon such query and generates search results (where the search engine 110 may or may not cause such search results to be displayed to the user). The generative model 112 receives information extracted from the search results, and such information is included in the prompt used by the generative model 112 to generate output (e.g., conversational output). The prompt can include: 1) the initial query "famous people born in Chicago"; 2) first search information extracted from the initial set of search results identified by the search engine 110 based upon the initial query; 3) the input set forth by the user "what about Al Capone"; 4) optionally, second search information extracted from second search results identified by the search engine based upon the query "what about Al Capone"; 5) the query generated by the generative model 112 ("birthplace of Al Capone"); and third search information extracted from search results identified by the search engine 110 based upon the query "birthplace of Al Capone".

The generative model 112 can generate the conversational output "Al Capone was born in New York City in 1899" based upon the prompt. This approach increases the likelihood that the output generated by the generative model 112 is factually accurate, as the generative model 112 generates the output based upon search results identified and ranked by the search engine 110 (rather than based generally upon training data that is not curated based upon information retrieval intent of users).

As illustrated in FIG. 3, after being provided with the output "Al Capone was born in New York City in 1899", the client computing device 102 receives input "Michael Jordan?" from the user, and the generative model 112 is provided with such input. The generative model 112 constructs a query based upon the conversation context (the information in the prompt referenced above, the output generated based upon the prompt, the input "Michael Jordan?", and optionally information extracted from search results identified by the search engine 110 based upon such conversational input). In an example, the generative model 112 constructs the query "birthplace of Michael Jordan" and provides such query to the search engine 110. The search engine 110 identifies search results based upon the query received from the generative model 112, extracts information from these search results, and provides the information to the generative model 112. The generative model 112 can then generate output (e.g., "Michael Jordan was also born in New York City (1963)") based upon at least some of the aforementioned context. As size of the prompt that can be provided to the generative model 112 is limited, techniques can be employed to identify appropriate information to include in the prompt. In an example, the prompt can be managed on a first in-first out basis, such that older information is removed while newer information is retained in the prompt. In another example, information can be assigned relevance scores, and information with the highest relevance scores can be retained in the prompt while information with lowest relevance scores can be removed. A combination of such approaches can also be employed. For example, a relevance score can be used as a filter, such that information with a relevance score beneath a threshold is removed; afterwards, a first in first out approach can be employed.

It is again emphasized that FIG. 3 represents an improvement over both conventional search engines as well as conventional generative models. Utilizing the technologies described herein, the GUI 300 of the search engine 110 presents information to the user that was previously unable to be presented—a conversational interface that provides the user with information that is of interest to the user. In addition, the generative model 112 provides information to the user that is relatively up-to-date (as the search engine 110 returned such information as a relevant search result) and is factually accurate.

Figure 4:
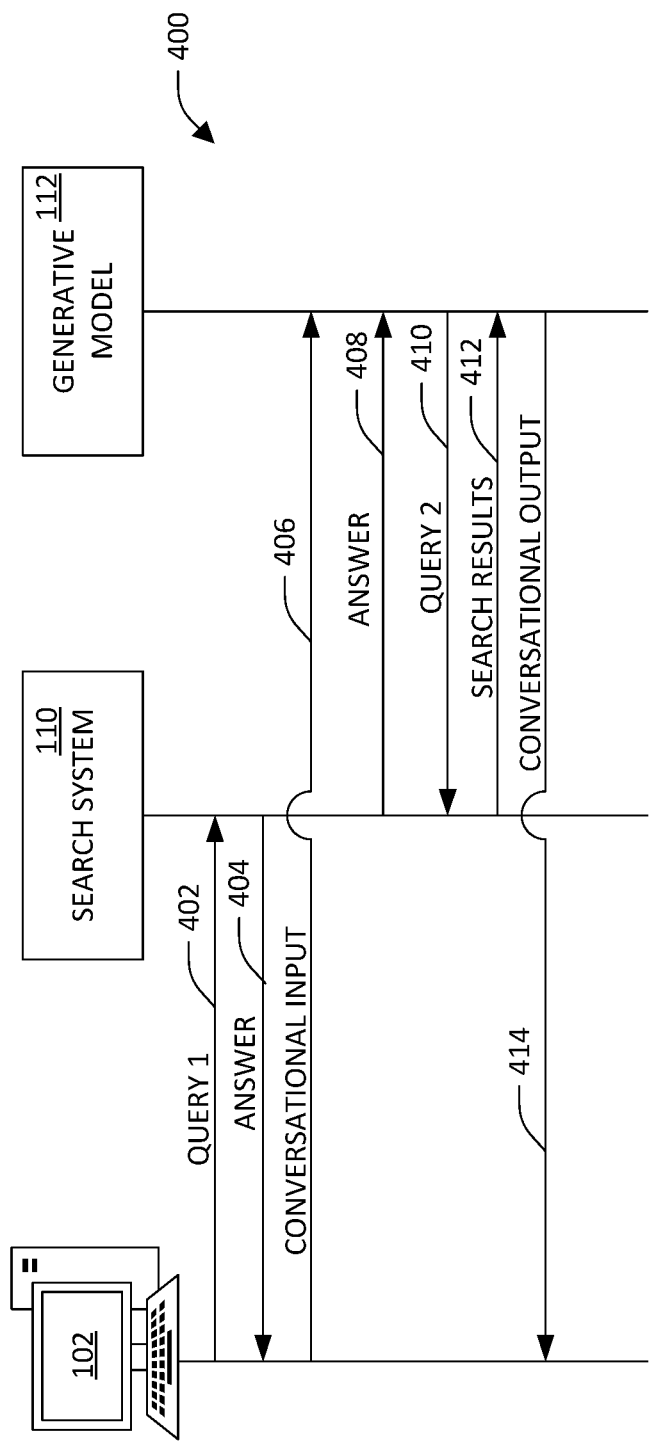
FIG. 4 is a communications flow diagram that illustrates another example flow of communications between a client computing device, a search engine, and a generative model.

Now referring to FIG. 4, another communications diagram 400 depicting communications between the client computing device 102, the search engine 110, and the generative model 112 is illustrated. The client computing device 102 receives a query from the user (e.g., by way of a GUI of a search engine, an address field of a web browser, etc.). The client computing device 102 transmits the query to the search engine 110 at 402. The search engine 110 executes a search based upon the query (searches at least one of the data stores 114-120 based upon the query). In an example, the search engine 110 identifies an instant answer based upon the query.

At 404, the search engine 110 transmits the instant answer to the client computing device 102. For instance, the instant answer is a graphical element that includes an answer to the query set forth by the user, and further includes an input field by way of which text (or other suitable input) directed to the generative model 112 can be received. The client computing device 102 receives input by way of such text entry field, and at 406 the client computing device 402 transmits the input to the generative model 112 (e.g., optionally by way of the search engine 110). At 408, the generative model 112 obtains the instant answer identified by the search engine 110 based upon the query received at 402. Further, optionally, the generative model 112 requests information extracted from webpages identified by the search engine 110 as being relevant to the query. For instance, the information can be extracted from the N most highly ranked webpages, where N can be 3, 5, or 10. In another example, when the input is received by the generative model 112 by way of the search engine 110, the search engine 110 provides the generative model 112 with the instant answer upon receiving an indication that conversational input is being set forth to the generative model 112.

The generative model 112 generates a second query based upon, for example, the first query received at the search engine 110, the instant answer to the search query provided by the search engine 110, (optionally) the information extracted from the N most highly ranked webpages, and the conversational input received by the generative model 112. Notably, since the interaction was received by way of an interface associated with the instant answer, the search results provided to the generative model 112 can be limited to the instant answer (and may not include other search results identified by the search engine 110). The generative model 112 provides the second query to the search engine 110 at 410, and the search engine 110 generates updated search results based upon the second query. The search engine 110 provides the updated search result to the generative model 112 at 412. The generative model 112 generates (conversational) output based upon the conversational input obtained by the generative model 112, the second query generated by the generative model 112, and the search results obtained from the search engine 110 by the generative model 112. The generative model 112 provides the conversational output to the client computing device 102 at 414 (e.g., by way of the search engine 110).

Figure 5:
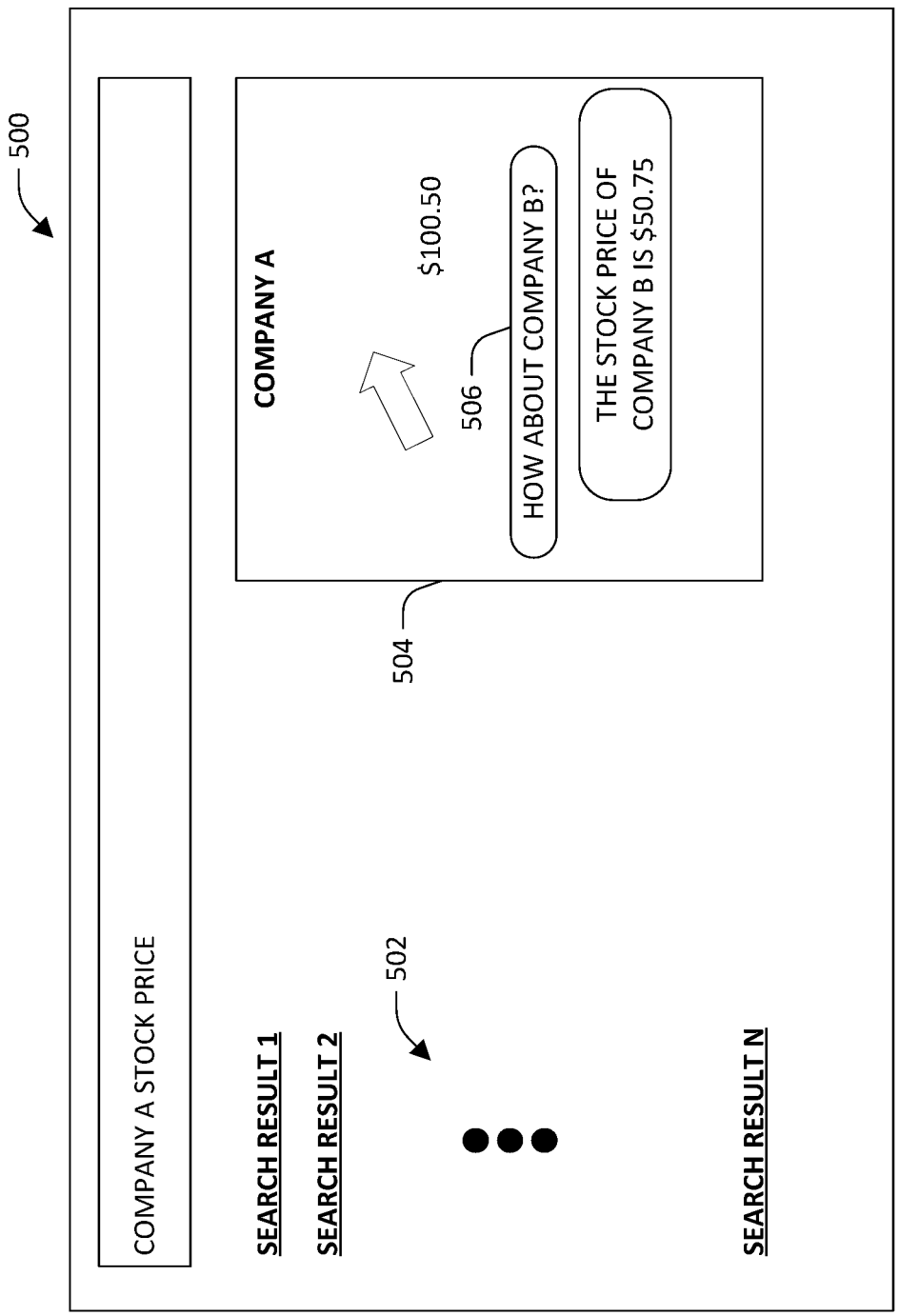
FIG. 5 depicts a GUI of a search engine results page (SERP) that includes a widget that comprises an interface by way of which communications are provided to and received from a generative model.

Now referring to FIG. 5, a GUI 500 is set forth as an example that accords to the communications diagram 400 illustrated in FIG. 4. The GUI 500 can be a search engine GUI, where the user of the client computing device 102 has set forth the query "company A stock price." The search engine 110 receives the query and generates a SERP based upon the query. The SERP includes a list of search results 502 identified based upon the query, and further includes an instant answer 504 identified by the search engine 110 based upon a search of the instant answers data store 116. The instant answer 504 can include an identifier for the company referenced in the received query, a graphical indicator that identifies a trend of the stock price, and a price of the stock for Company A. The instant answer 504 can further include a text entry field 506 by way of which the user of the client computing device 102 can set forth conversational input that is to be provided to the generative model 112. In the example illustrated in FIG. 5, the text entry field 506 receives the conversational input "how about company B?"

In this example, the generative model 112 obtains the query submitted to the search engine 110 by the user and further obtains content of the instant answer identified by the search engine 110 based upon the query. The generative model 112 can generate a second query based upon the query submitted by the user and content of the instant answer 504, and the generative model 112 can submit this second query to the search engine 110. For instance, the second query is "stock price of company B". The search engine 110 searches at least one of the data stores 114-120 based upon the second query provided to the search engine 110 by the generative model 112 and identifies updated search results based upon the second query. The search engine 110 provides these updated search results to the generative model 112, and the generative model 112 generates output based upon: 1) the initial query submitted to the search engine 110 by the user; 2) content of the instant answer 504 identified by the search engine 110 based upon the query; 3) the input set forth to the generative model 112 by the user of the client computing device 102; 4) the second query generated by the generative model 112 (e.g., "stock price of company B"); and 5) the updated search results identified by the search engine 110 based upon the second query. As illustrated in FIG. 5, the generative model 112 can generate the output "the stock price of Company B is $50.75".

Conventional generative models are unable to provide this output, as conventional generative models are trained based upon stale data and are unable to obtain recent information. Utilizing the technologies described herein, however, the generative model 112 can generate output that includes recent (and accurate) data, as such data was provided to the generative model 112 as part of the prompt used by the generative model 112 to create output.

In the example illustrated in FIG. 5, it is emphasized that the instant answer includes an interface by way of which a conversation can be initiated with the generative model 112. It is further emphasized that, since the conversation with the generative model 112 was initiated by way of the instant answer 504, the context used by the generative model 112 to generate conversational output can be limited to what is included in the instant answer 504 (rather than the context including information shown in other search results identified by the search engine 110). Further, similar features are contemplated with respect to entity cards, widgets, etc. returned by the search engine.

Figure 6:
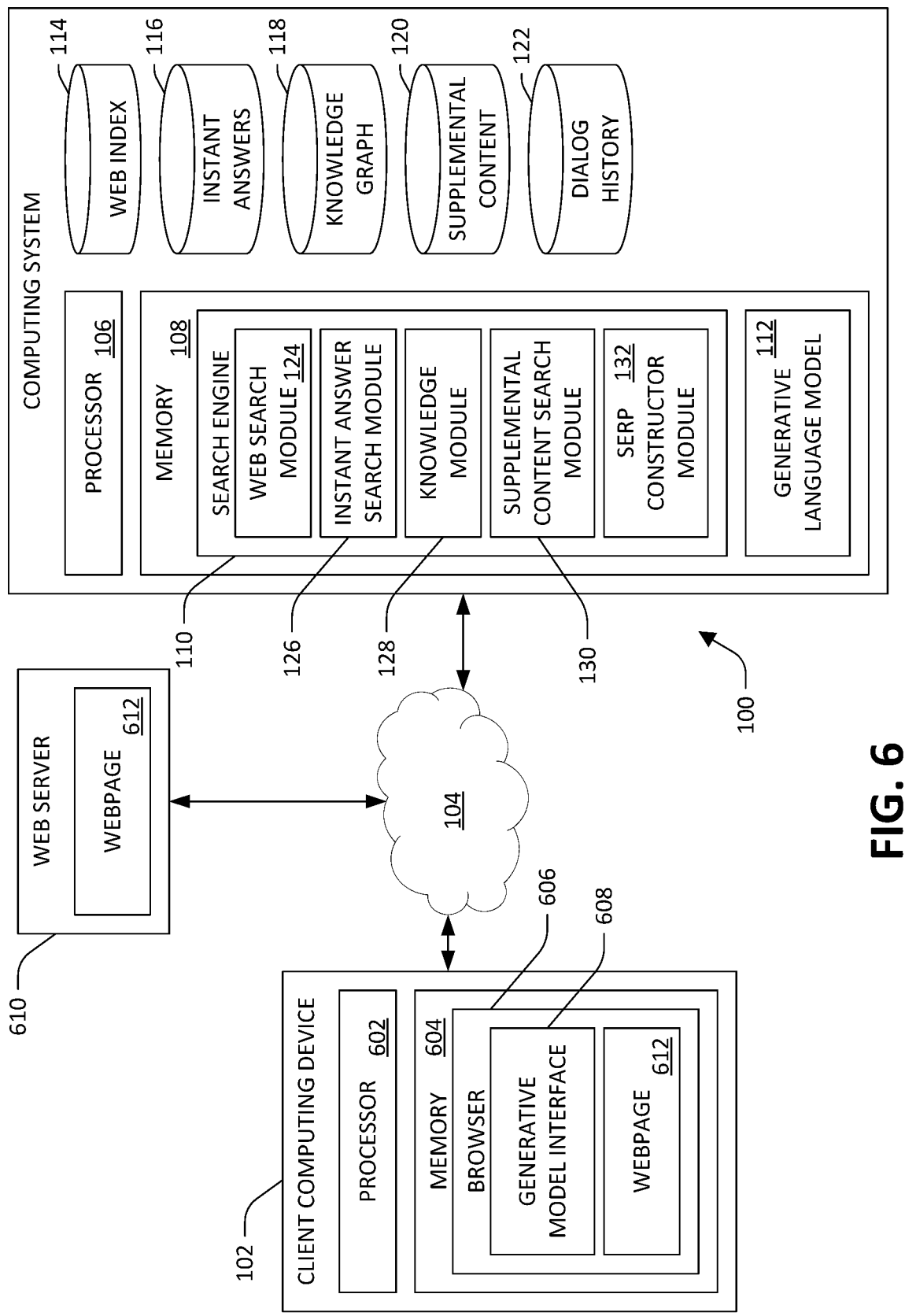
FIG. 6 is a functional block diagram of a computing system that provides content of a webpage to a generative model to use as a prompt.

With reference now to FIG. 6, a functional block diagram of the computing system 100 is presented. The computing system 100 is in communication with the client computing device 102, and the client computing device 102 includes a processor 602 and memory 604, where the memory 604 has a web browser 606 loaded therein. The web browser 606 has a generative model interface 608 incorporated therein, where the web browser 606 provides information to the generative model 112 by way of the generative model interface 608. Similarly, the generative model 112 provides information to the web browser 606 by way of the generative model interface 608.

A web server 610 is in communication with the client computing device 102 by way of the network 104. The web server 610 hosts a website that includes a webpage 612. The web browser 606 is configured to retrieve webpages of the website hosted by the web server 610. Accordingly, the web browser 606 can retrieve the webpage 612 from the web server 610 (e.g., based upon user input, based upon programmatic input, etc.).

Because the generative model 112 is in communication with the browser 606, the generative model 112 can be provided with any suitable information that can be obtained by the browser 606 as part of a prompt (in addition to conversational input set forth by a user of the client computing device 102). For example, the webpage 612 retrieved by the web browser 606 can include an e-mail sent to the user. Presuming that the user has provided authorization for the generative model 112 to obtain part of such e-mail, in response to the web browser 606 receiving an indication that a conversation between the user and the generative model 112 is to be initiated, the web browser 606 can provide information from the webpage 612 (e.g., the email) to the generative model 112. In addition, the web browser 606 receives input from the user and provides the generative model 112 with such input. Accordingly, the prompt provided to the generative model 112 includes not only the input set forth by the user, but additionally includes content of the webpage 612 being viewed by the user. Therefore, the generative 112 can generate output based upon content of the webpage 612. In an example, the content of the webpage 612 provided to the generative model 112 is an entirety of text of the webpage 612. In another example, the content of the webpage 612 provided to the generative model 112 is all content on the webpage 612, including an image, a video, etc. of the webpage. In yet another example, the content of the webpage 612 provided to the generative model 112 is a portion of content of the webpage selected by the user. In still yet another example, the content of the webpage 612 corresponds to a threshold number of tokens that can be included in a prompt for the generative model 112 (e.g., 7000 tokens, where each token represents one or more characters).

Further, the generative model 112 can generate a query based upon the content of the webpage 612 provided by the browser 606 and/or the input set forth by the user. The generative model 112 provides the query to the search engine 110, and the search engine 110 searches at least one of the data stores 114-120 based upon the query. The search engine 110 provides the generative model 112 with search results identified by the search engine 110 based upon the query, thereby providing additional context for the generative model 112 to employ when generating output to the user. More specifically, the prompt employed by the generative model 112 to generate output can additionally include the search results identified by the search engine 110.

Figure 7:
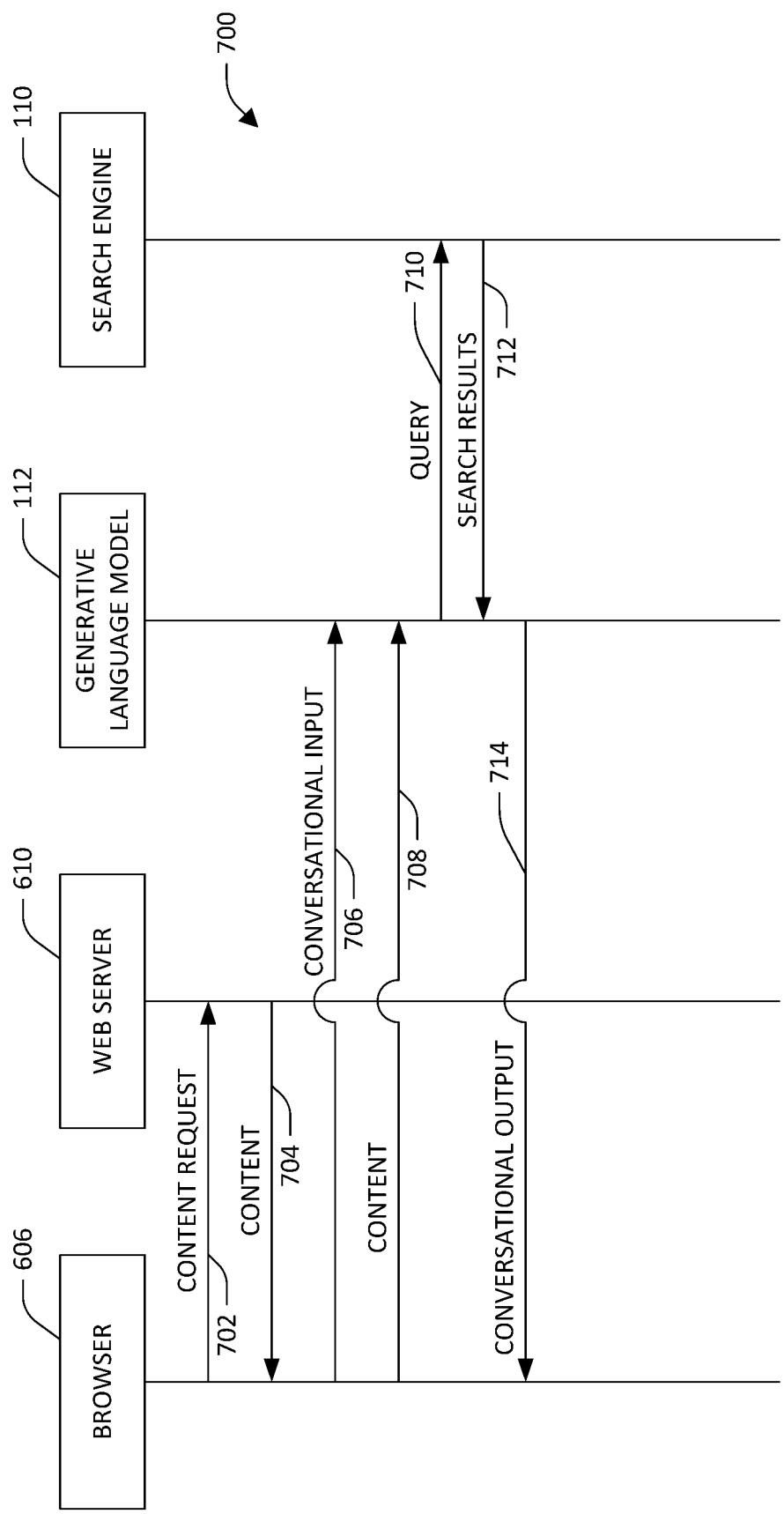
FIG. 7 is a communications flow diagram that illustrates an example flow of communications between a web browser, a web server, a generative model, and a search engine.

Referring now to FIG. 7, a communications diagram 700 depicting an example flow of communications between the web browser 606, the web server 610, the generative model 112, and the search engine 110 is presented. In an example, a user of the client computing device 102 sets forth a request to the web browser 606 to obtain the webpage 612 from the web server 610. The web browser 606 transmits the request for the webpage 612 to the web server 610 at 702. At 704, the web server 610 transmits the webpage 612 to the web browser 606, whereupon the webpage 612 is presented on a display of the client computing device 102 by the web browser.

While the webpage 612 is loaded in the web browser 606, the user of the client computing device 102 can set forth an indication to the web browser 606 that input is to be provided to the generative model 112 from the user. In an example, the web browser 606 may include a button, wherein upon the button being selected by the user, a text entry field for setting forth conversational input to the generative model 112 is presented in the web browser 606. The web browser 606 can then receive input from the user by way of the text entry field (or a voice command). At 706, the web browser 606 transmits the input received from the user to the generative model 112. Additionally, at 708, the web browser 606 transmits content from the webpage 612 (or information about the webpage 612 known by the web browser 606) to the generative model 112. Hence, the generative model 112 is provided with both the input and content of the webpage 612 as at least a part of a prompt to be used by the generative model 112 to generate output.

Optionally, the generative model 112 generates a query based upon the received input and/or the content from the webpage 612. In an example, the generative model 112 can generate several queries, with each query being well-suited for use by the search engine 110 to search over a respective data store in the data stores 114-120. At 710, the generative model 112 transmits a query generated by the generative model 112 to the search engine 110. The search engine 110 generates search results based upon the query and provides the search results (or information about the search results) to the generative model 112 at 712. The generative model 112 can generate output that is responsive to the input received at 706, where the generative model 112 generates the output based upon the input, the content of the webpage 612 received from the web browser 606, and optionally the search results received from the search engine 110. At 714, the generative model 112 transmits the output to the web browser 606 and the web browser 606 presents the output to the user of the client computing device 102. While the communications flow diagram 700 depicts one dialogue turn, it is to be understood that the process can repeat and the generative model 112 can be provided with further context.

Various alternatives are also contemplated. For example, while the client computing device 102 has been described as executing the web browser 606, it is understood that any suitable application that presents content to users can have the generative model interface 608 incorporated therein. Therefore, for instance, an e-mail application can include the generative model interface 608, a word processing application may include the generative model interface 608, and so forth. Further, while the generative model 112 has been described herein as being executed remotely from the client computing device 102, it is contemplated that at least a portion of the generative model 112 may execute on the client computing device 102 (e.g., at least a portion of the generative model 112 may be included in the web browser 606 or other suitable application that is executing on the client computing device 102).

Figure 8:
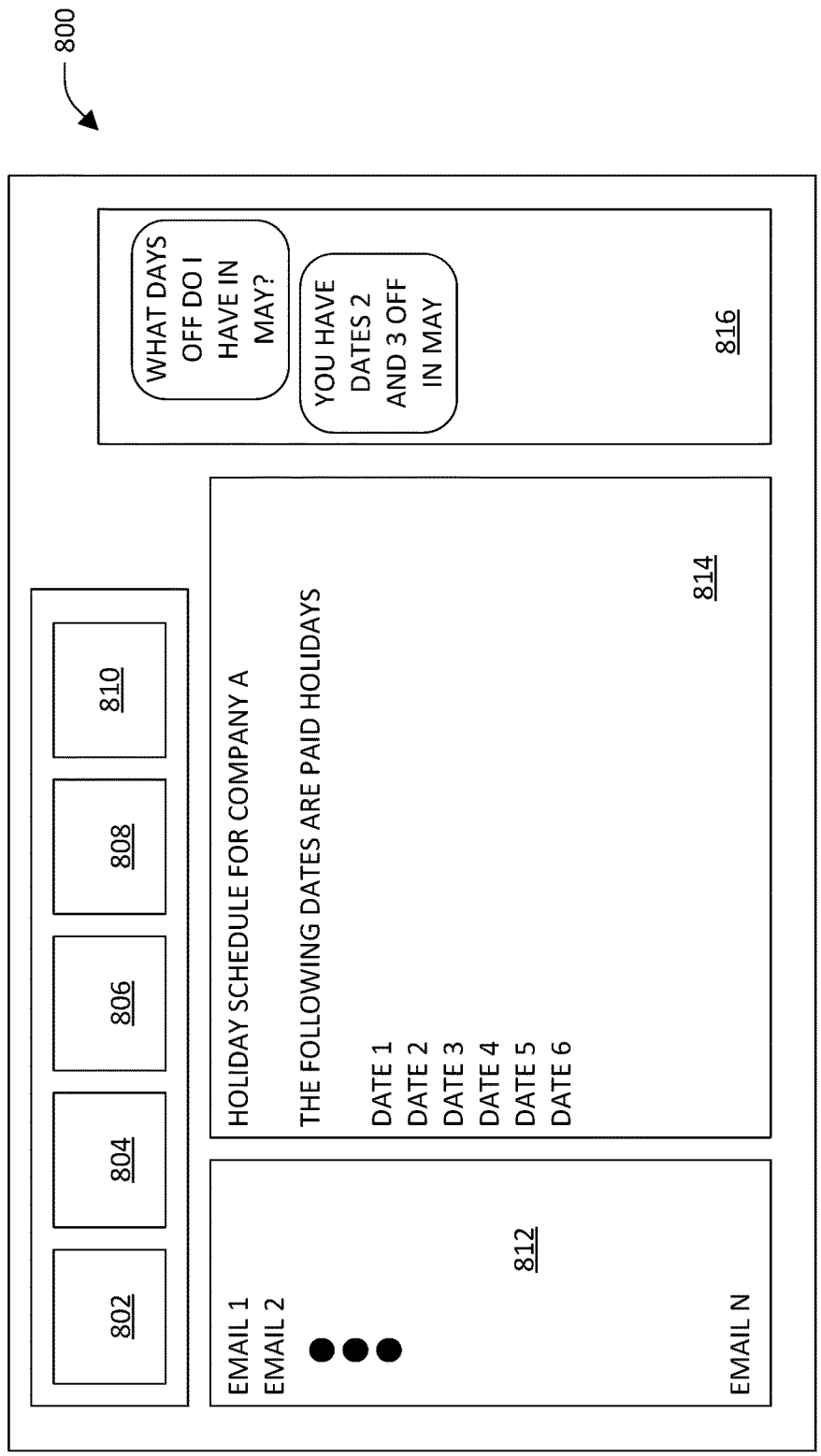
FIG. 8 depicts a GUI of a webpage that includes an email and an interface by way of which communications are provided to and received from a generative model.

With reference now to FIG. 8, a GUI 800 of a webpage that depicts an email inbox of a user is presented. The GUI 800 can include several selectable buttons 802-810 that correspond to functionality associated with the email inbox, such as a button that is associated with sending an email, a button that is associated with refreshing the inbox, and so forth. The GUI 800 may include a pane 812 that depicts a list of emails in the inbox of a user. The GUI 800 can further include a window 814 that can include content of an email being read by the user. As noted above, the web browser 606 can include the generative model interface 608, such that the web browser 606 can cause a conversation pane 816 to be presented by way of which the user can set forth conversational input to the generative model 112 (e.g., as an overlay on the webpage represented in FIG. 8).

In the example shown in FIG. 8, the email in the window 814 includes information about holidays for the user over the upcoming calendar year. The user can set forth input by way of the conversation pane 816, and the web browser 606 transmits the input to the generative model 112 by way of the generative model interface 608. In addition, the web browser 606 can provide information from the email shown in the window 814 to the generative model 112 by way of the generative model interface 608. Therefore, the prompt used by the generative model 112 to generate conversational output includes the content of the email. As illustrated, the user has set forth the input "what days off do I have in May?" As the generative model 112 is provided with both the input and the content of the email shown in the window 814, the generative model 112 can generate output that accurately addresses the input (identifying the holidays of the user in the month of May). Conventionally, a generative model is unable to appropriately respond to such input, as the conventional generative model does not have access to the information requested by the user.

Figure 9:
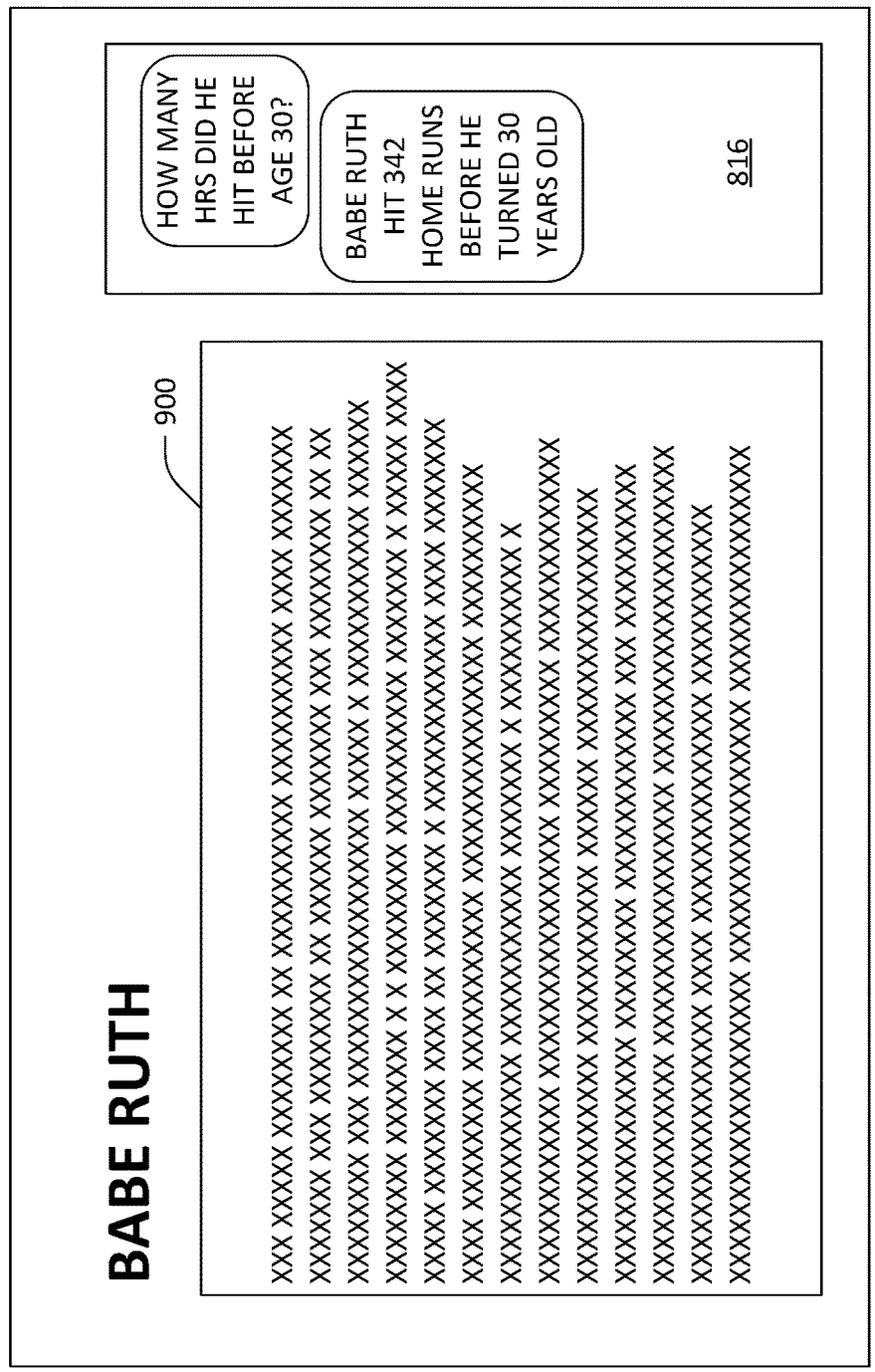
FIG. 9 depicts a GUI of a webpage and an interface by way of which communications are provided to and received from a generative model.

Referring now to FIG. 9, another example GUI 900 is presented. The GUI 900 corresponds to a webpage that includes information about the baseball player Babe Ruth. The GUI 900 includes a window 902 that comprises information about Babe Ruth, which may include season by season statistics (e.g., batting average, home runs, strikeouts, etc.). The GUI 900 additionally includes the conversation pane 816. When viewing the webpage, the user may set forth an indication that a conversation is desired with the generative model 112. For instance, by way of the conversation pane 816, the user sets forth the input "how many home runs did he hit before age 30?". The web browser 606 provides the input and at least some content of the webpage to the generative model 112. In an example, the generative model 112 generates queries based upon the conversational input and the content of the webpage. The generated queries may include "how many home runs did Babe Ruth hit", "when was Babe Ruth born", "home runs hit by Babe Ruth in 1923", etc. The generative model 112 provides the queries to the search engine 110, and the search engine 110 searches at least one of the data stores 114-120 based upon these queries. The search engine 110 provides at least some search results obtained based upon the queries to the generative model 112, and the generative model 112 uses the search results (in combination with the content from the webpage, the conversational input, queries generated by the generative model 112, and optionally other information) to generate output.

Further, for fact-based queries, the generative model 112 can optionally be configured to provide some indication as to confidence in factual accuracy of the output. In an example, the more information relied upon by the generative model 112 from the webpage and the search results to generate the output (and the less that the generative model 112 relies upon the underlying training data to generate the output), the higher the confidence in factual accuracy of the conversational output.

Figure 10:
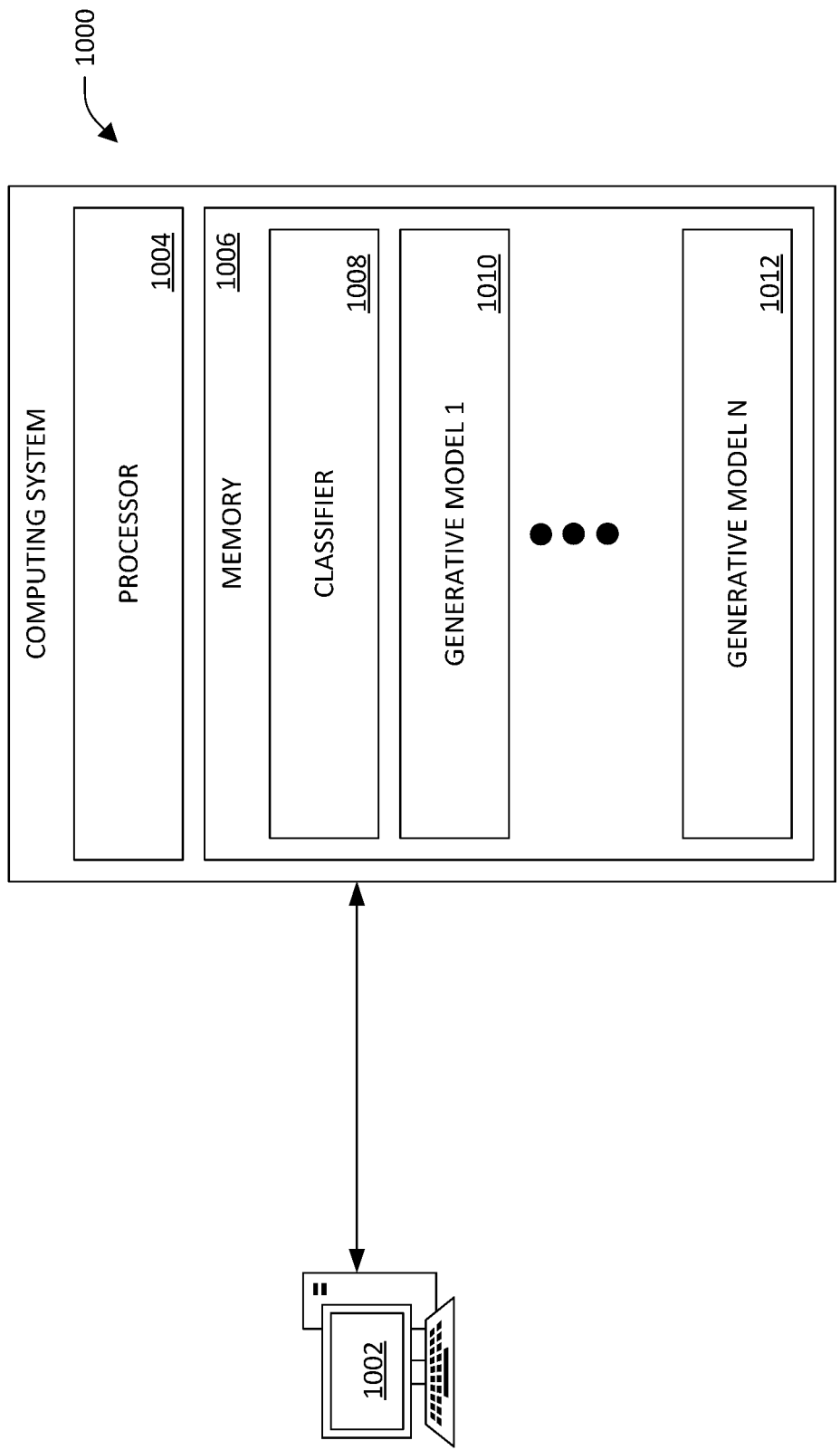
FIG. 10 is a functional block diagram of a computing system that executes multiple generative models.

Referring now to FIG. 10, a schematic illustrating a computing system 1000 in communication with a client computing device 1002 is presented. The computing system 1000 includes a processor 1004 and memory 1006. The memory 1006 includes instructions that are executed by the processor 1004. As illustrated, the memory 1006 includes a classifier 1008 and several generative models 1010-1012. In an example, the first generative model 1010 utilizes a first number of graphical processing units (GPU) when generating an output based upon an input, while the nth generative model 1012 utilizes a second number of GPUs when generating an output based upon an input. For instance, the first number of GPUs is larger than the second number of GPUs.

In another example, the first generative model 1010 is trained for a first topic, where the first generative model 1010 is trained based upon content from webpages labeled as corresponding to the first topic; the nth generative model 1012 is trained for a second topic, where the nth generative model 1012 is trained based upon content from webpages labeled as corresponding to the nth topic. Hence, the first generative model 1010 is well-suited to generate outputs that correspond to the first topic (but not the nth topic) while the nth generative model 1012 is well-suited to generate outputs that correspond to the nth topic (but not the first topic).

In yet another example, the first generative model 1010 is configured to receive a prompt of a first size as input, while the nth generative model 1012 is configured to receive prompt of a second size as input (where the second size is greater than the first size).

The classifier 1008 is configured to assign a class label from amongst several possible class labels to input received from the client computing device 1002; a generative model from amongst the generative models 1010-1012 is selected based upon the class label, and the selected generative model is provided with the input upon being selected. For instance, the classifier 1008 is employed to select appropriate generative models such that outputs are of high quality yet computing resources needed to generate the outputs are reduced.

In operation, the computing system 1000 receives, from the client computing device 1002, input set forth by a user of the client computing device 1002. Optionally, as described above, the input can be provided to a search engine, where the search engine identifies search results based upon the input. The classifier 1008 obtains the input set forth by the user of the client computing device 1002 and optionally the search results identified by the search engine, and the classifier 1008 assigns a class label to such input. In an example, the classifier 1008 can assign a class label to input, where the class label indicates that the input is relatively complex (such as the input "can you provide me with instructions for removing, cleaning, and reinstalling a carburetor from a 1974 truck"). Based upon the assigned class label, the computing system 1000 selects a generative model from amongst the generative models 1010-1012, where the selected generative model is configured to answer complex questions and thus consumes a relatively large amount of computing resources. In a different example, the classifier 1008 receives the input "what is the weather in Seattle today" and assigns a class label to such input that indicates that the input is relatively simple. The computing system 1000 selects a generative model from amongst the generative models 1010-1012 and provides the input to the selected generative model, where the selected generative model uses a relatively small amount of computing resources to generate output based upon the input. Thus, computing resources are preserved, as the more complex model is reserved for relatively complex inputs, and the less complex model is used for less complex inputs.

In another example, the classifier is configured to assign a class label to an input received from the client computing device 1002 that identifies a topic related to the input. The computing system 1000 selects a generative model from amongst the generative models 1010-1012 that is trained with data pertaining to such topic based upon the class label assigned to the input. For instance, the computing system 1000 receives the input "how many home runs did Babe Ruth hit before he turned 30" and the classifier 1008 assigns a class label of "sports" to such input. The computing system 1000 selects a generative model from amongst the generative models 1010-1012 that has been trained on content that is associated with the topic of "sports", and the input is provided to such generative model. A generative model trained with respect to a single topic may require fewer computing resources to generate an output when provided with an input that pertains to the topic than a non-topic-specific generative model when provided with the same input. Further, training a topic-specific generative model can be completed more quickly when compared to training a more robust generative model, as less training data is used. It is appreciated that the training data can include webpages indexed by a search engine, as the search engine typically assigns topics to such webpages.

In yet another example, the classifier 1008 assigns a label to input received from the client computing device 1002 based upon size of such input. As indicated previously, the first generative model 1010 may be configured to receive a prompt of a first size, while the nth generative model 1012 may be configured to receive a prompt of a second size (that is larger than the first size). Further, the prompt can include content of a webpage being viewed by a user of the client computing device 1002, and therefore the input referenced above can include content of the webpage. The classifier 1008 can identify a size of the content (e.g., a number of tokens in the content). When the classifier 1008 determines that the number of tokens in the content of the webpage is less than a threshold, the first generative model 1010 can be selected and can be provided with the prompt. When, however, the number of tokens in the content of the webpage is greater than or equal to the threshold, the nth generative model 1012 can be selected and provided with the prompt. As the nth generative model 1012 receives the larger prompt and generates output based upon the larger prompt, the nth generative model 102 may consume more computing resources than the first generative model 1010 when generating output. Hence, through use of the classifier 1008, computing resources can be managed. Moreover, combinations of the approaches described herein can be combined—for instance, a generative model can be selected based upon a complexity label assigned to input and a topic label assigned to the input. In another example, a generative model can be selected based upon a topic label assigned to input and a size of webpage content. Other combinations are contemplated.

In yet another example, the classifier 1008 is configured to assign class labels to outputs of the generative models 1010-1012, and an output generated by a generative model can be returned to the client computing device 1002 based upon the class label assigned to such output. For instance, the first generative model 1010 consumes a first amount of computing resources when generating an output while the nth generative model consumes a second amount of computing resources when generating the output, where the first amount of computing resources is less than the second amount of computing resources. Accordingly, when an input is received by the computing system 1000, by default the computing system 1000 can provide the input to the first generative model 1010. The first generative model 1010 generates an output based upon the input, and the classifier 1008 receives the output. The classifier assigns a class label to the output (e.g., based upon the output and optionally the input), where the class label indicates whether the output is acceptable or not acceptable. When the class label indicates that the output generated by the first generative model 1010 is acceptable, the computing system 1000 transmits the output the client computing device 1002 for presentment to the user thereof. When, however, the class label output by the classifier 1008 indicates that the output is not acceptable, the computing system 1000 provides the input to the nth generative model 1012, and the nth generative model generates a second output based upon the input. The computing system 1000 then provides the second output to the client computing device 1002.

In some embodiments, the input can be simultaneously provided to several generative models that utilize relatively small amounts of computing resources when generating outputs based upon the inputs, and when the classifier 1008 indicates that one of such outputs is acceptable, the computing system 1000 provides the output to the client computing device 1002. When none of the outputs is acceptable, the computing system 1000 provides the input to the generative model that utilizes a relatively large amount of computing resources to generate output; hence, the generative model that utilizes a relatively large amount of computing resources to generate outputs is provided with input only when one or more generative models that utilize fewer resources to generate outputs are unable to generate an acceptable output for the input.

Figure 11:
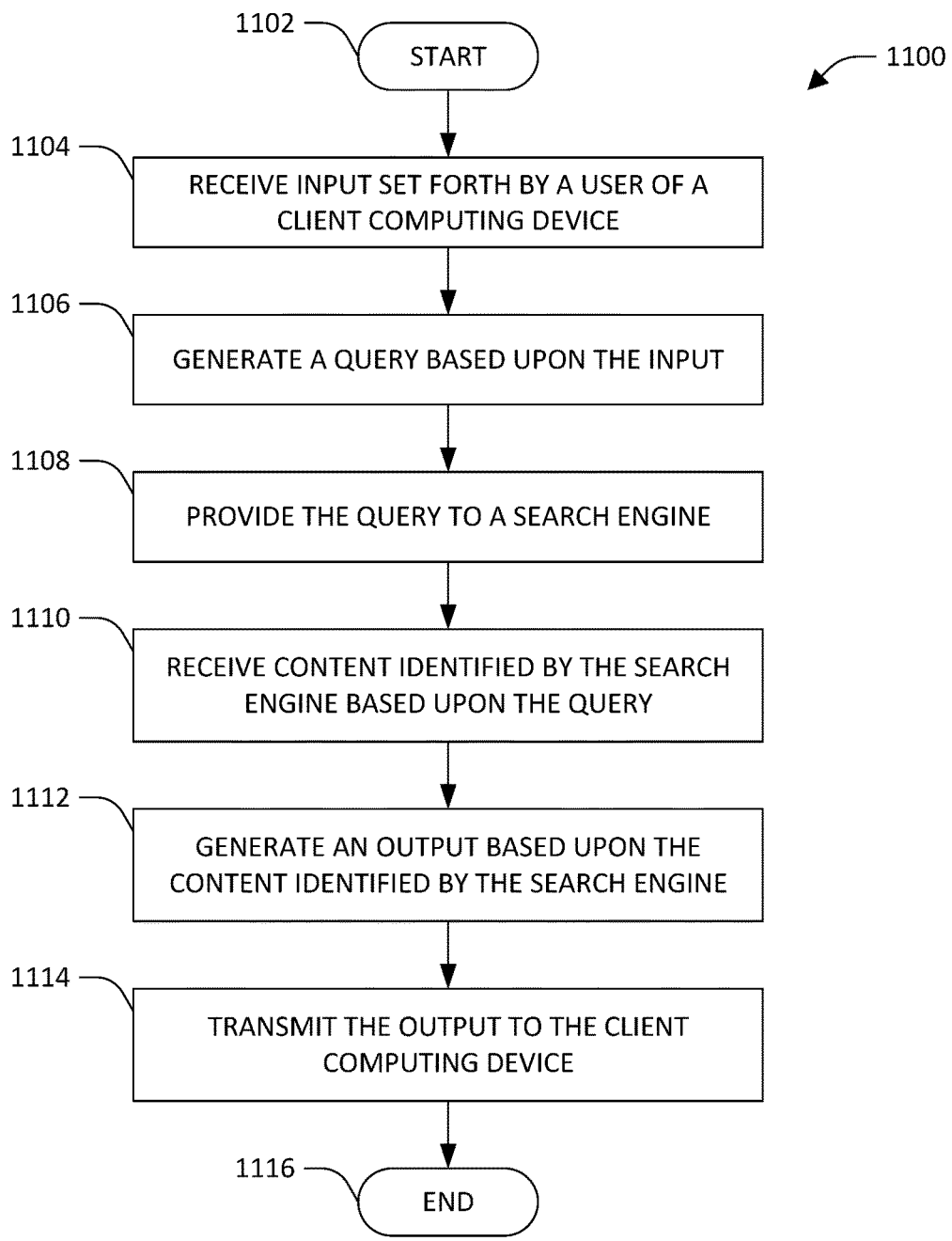
FIG. 11 is a flow diagram illustrating a methodology for generating output by a generative model based upon content identified by a search engine.
Figure 12:
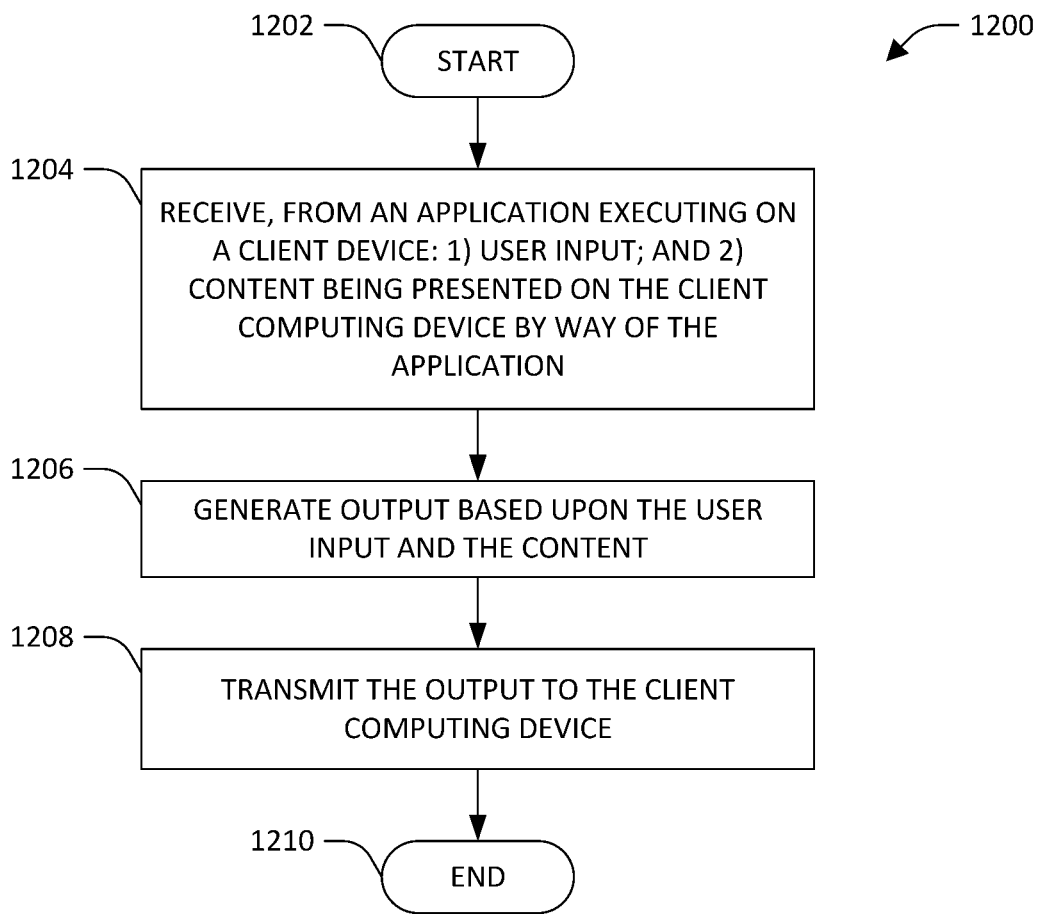
FIG. 12 is a flow diagram illustrating a methodology for generating output by a generative model based upon content being presented at a client computing device.

FIGS. 11 and 12 illustrate methodologies relating to generation of output by a generative model based upon contextual information. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring solely to FIG. 11, a methodology 1100 for generating, by a generative model, output based content received from a search engine is illustrated. The methodology 1100 starts at 1102, and at 1104 the generative model receives input set forth by a user to a client computing device that is in network communication with the generative model, where the input is received from the client computing device. At 1106, the generative model generates a query based upon the input. For instance, the input may be a relatively long text, and the generative model can identify entities in such text and generate the query based upon the identified entities, where the query is shorter than the original input.

At 1108, the query is provided to the search engine. The search engine performs a search based upon the query and identifies content that is relevant to the query. The content can be a portion of a webpage or webpages identified by the search engine as being relevant to the query, an instant answer, an entity card, and so forth. At 1110, the generative model receives the content identified by the search engine as being relevant to the query, and at 1112 the generative model generates an output based upon such content. In addition, the output can include a citation or citations to the content identified by the search engine. The output can be textual (conversational), can be or include an image, can be or include a video, can be audio output, etc. At 1114, the output is transmitted to the client computing device for presentment to the user. The methodology 1100 completes at 1116.

Turning now to FIG. 12, a methodology 1200 performed by a generative model is depicted. The methodology 1200 starts at 1202, and at 1204 data is received from an application executing on a client computing device (such as a web browser, an email application, or the like). The data includes input set forth to the client computing device by the user (where the input is intended for provision to the generative model). The data also includes content being presented on the client computing device by way of the application. For instance, a web browser can be configured to capture content displayed on a webpage and transmit such content to the generative model together with the user input upon the user setting forth the user input and indicating that the content is to be transmitted to the generative model.

At 1206, the output generated by the generative model is transmitted to the client computing device for presentment by way of the application. Optionally, while not shown, the generative model generates a query based upon the received input and the content, and transmits the query to a search engine, whereupon the search engine identifies second content that is relevant to the query. The generative model can generate the output based upon the input, the query, the content, and/or the second content. The methodology 1200 completes at 1208.

Figure 13:
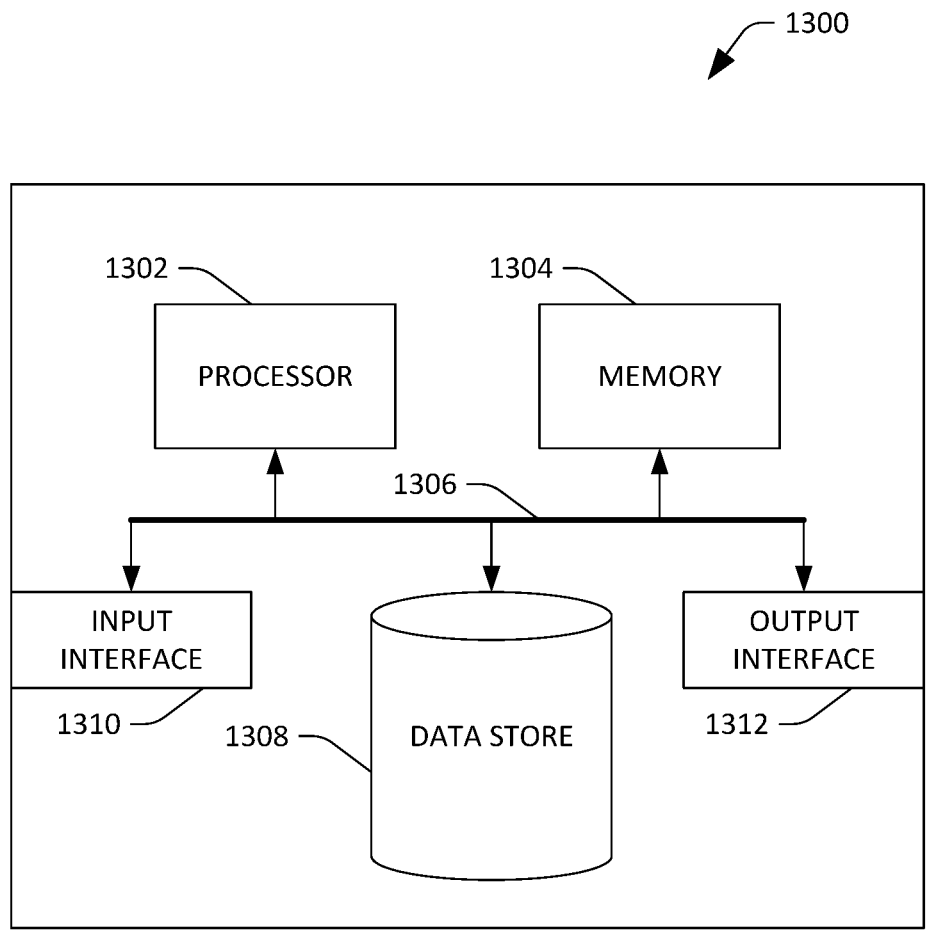
FIG. 13 is a schematic of a computing system.

Referring now to FIG. 13, a high-level illustration of an exemplary computing device 1300 that can be used in accordance with the systems and methodologies disclosed herein is illustrated. For instance, the computing device 1300 may be used in a system that is configured to provide search results identified by a search engine as a part of a prompt to a GLM. By way of another example, the computing device 1300 can be used in a system that is configured to provide content of a webpage as part of a prompt to a GLM. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store prompts, images, etc.

The computing device 1300 additionally includes a data store 1308 that is accessible by the processor 1302 by way of the system bus 1306. The data store 1308 may include executable instructions, instant answers, a web index, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Described herein are various features pertaining to integration of a computer-implemented search engine and a generative model in accordance with at least the following examples.

(A1) In an aspect, a method described herein includes receiving, by a generative model, input set forth by a user of a client computing device that is in network communication with the computing system. The method also includes generating, by the generative model, a query based upon the input set forth by the user. The method additionally includes providing the query to a search engine and receiving, by the generative model and from the search engine, content identified by the search engine based upon the query. The method also includes generating, by the generative model, an output based upon a prompt, where the prompt includes the content identified by the search engine based upon the query. The method further includes transmitting the output to the client computing device for presentment to the user.

(A2) In some embodiments of the method of (A1), the prompt further includes the query generated by the generative model.

(A3) In some embodiments of the method of at least one of (A1)-(A2), the prompt further includes the input set forth by the user of the client computing device.

(A4) In some embodiments of the method of at least one of (A1)-(A3), the output comprises a textual response to the input set forth by the user of the client computing device.

(A5) In some embodiments of the method of at least one of (A1)-(A4), the output comprises an image generated by the generative model based upon the prompt.

(A6) In some embodiments of the method of at least one of (A1)-(A5), the content identified by the search engine based upon the query is an instant answer identified by the search engine based upon the query.

(A7) In some embodiments of the method of at least one of (A1)-(A6), the content identified by the search engine based upon the query comprises a portion of a webpage identified by the search engine as being relevant to the query.

(A8) In some embodiments of the method of at least one of (A1)-(A7), the method also includes receiving, from the client computing device, second content extracted from an electronic page being presented by way of a computer-implemented application on the client computing device at a time that the input is received, and further where the prompt includes the second content.

(A9) In some embodiments of the method of (A8), the computer-implemented application is a web browser, and further where the second content comprises text of a webpage loaded by the web browser.

(A10) In some embodiments of the method of (A8), the computer-implemented application is an email application, and further where the second content comprises text of an email displayed by way of the email application.

(A11) In some embodiments of the method of at least one of (A1)-(A10), the method also includes subsequent to transmitting the output to the client computing device, receiving, by the generative model, second input set forth by the user of the client computing device. The method also includes generating, by the generative model, a second query based upon the second input set forth by the user. The method further includes providing the second query to a search engine and receiving, by the generative model and from the search engine, second content identified by the search engine based upon the second query. The method also includes generating, by the generative model, a second output based upon a second prompt. The second prompt includes: 1) the content identified by the search engine based upon the query; and 2) the second content identified by the search engine based upon the second query. The method also includes transmitting the second output to the client computing device for presentment to the user.

(A12) In some embodiments of the method of at least one of (A10)-(A11), the prompt further includes the input set forth by the user and the query generated by the generative model.

(A13) In some embodiments of the method of at least one of (A10)-(A12), the generative model is a transformer-based model.

(B1) In another aspect, a method performed by a processor of a computing system that executes a generative model includes receiving, from a client computing device that is in network communication with the computing system, textual input set forth to the client computing device by a user of the client computing device. The method also includes generating a query based upon the input. The method further includes providing the query to a search engine that is in communication with the generative model. The method additionally includes providing the query to a search engine that is in communication with the generative model. The method further includes receiving a portion of a webpage identified by the search engine as being relevant to the query generated by the generative model. The method also includes generating output based upon a prompt, where the prompt includes the portion of the webpage and the textual input received from the client computing device. The method additionally includes transmitting the output to the client computing device for presentment to the user.

(B2) In some embodiments of the method of (B1), the portion of the webpage is received due to the webpage being amongst the three highest ranked webpages by the search engine based upon the query.

(B3) In some embodiments of the method of at least one of (B1)-(B2), the method also includes receiving an instant answer identified by the search engine as being relevant to the query, where the prompt includes the instant answer.

(B4) In some embodiments of the method of at least one of (B1)-(B3), the method also includes receiving information from an entity card identified by the search engine as being relevant to the query, where the prompt includes the information extracted from the entity card.

(B5) In some embodiments of the method of at least one of (B1)-(B4), the output includes a citation to the webpage.

(B6) In some embodiments of the method of at least one of (B1)-(B5), the output includes an image generated by the generative model.

(C1) In another aspect, a computing system includes a processor and memory, where the memory stores instructions that, when executed by the processor, cause the processor to perform at least one of the methods disclosed herein (e.g., any of the methods of (A1)-(A13) or (B1)-(B6)).

(D1) In yet another aspect, a computer-readable storage medium includes instructions that, when executed by a processor, cause the processor to perform at least one of the methods disclosed herein (e.g., any of the methods of (A1)-(A13) or (B1)-(B6)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:
      causing input set forth by a user of a client computing device to be provided to a generative model;
      obtaining, from the generative model, a query based upon the input set forth by the user;
      providing the query to a search engine;
      obtaining, from the search engine, content identified by the search engine, where the search engine identified the content based upon the query;
      providing, to the generative model, the content identified by the search engine, where the generative model generates an output based upon the content identified by the search engine;
      obtaining, from the generative model, the output;
      transmitting the output to the client computing device for presentment to the user;
      subsequent to transmitting the output to the client computing device, causing second input set forth by the user of the client computing device to be provided to the generative model, where the generative model generates a second query based upon the input, the query, and the second input;
      obtaining, from the generative model, the second query;
      providing the second query to the search engine;
      obtaining, from the search engine, second content identified by the search engine, where the search engine identified the second content based upon the second query;
      providing, to the generative model, the second content identified by the search engine, where the generative model generates a second output based upon the content identified by the search engine and the second content identified by the search engine;
      obtaining, from the generative model, the second output; and
      transmitting the second output to the client computing device for presentment to the user.

2. The computing system of claim 1, where the prompt further includes the query generated by the generative model.

3. The computing system of claim 1, where the prompt further includes the input set forth by the user of the client computing device.

4. The computing system of claim 1, where the output comprises a textual response to the input set forth by the user of the client computing device.

5. The computing system of claim 1, where the output comprises an image generated by the generative model based upon the prompt.

6. The computing system of claim 1, where the content identified by the search engine based upon the query is an instant answer identified by the search engine based upon the query.

7. The computing system of claim 1, where the content identified by the search engine based upon the query comprises a portion of a webpage identified by the search engine as being relevant to the query.

8. The computing system of claim 1, the acts further comprising receiving, from the client computing device, second content extracted from an electronic page being presented by way of a computer-implemented application on the client computing device at a time that the input is received, and further where the prompt includes the second content.

9. The computing system of claim 8, where the computer-implemented application is a web browser, and further where the second content comprises text of a webpage loaded by the web browser.

10. The computing system of claim 8, where the computer-implemented application is an email application, and further where the second content comprises text of an email displayed by way of the email application.

11. The computing system of claim 1, where the prompt further includes the input set forth by the user and the query generated by the generative model.

12. The computing system of claim 1, where the generative model is a transformer-based model.

13. A method performed by a processor of a computing system that executes a generative model, the method comprising:
   receiving, from a client computing device that is in network communication with the computing system, textual input set forth to the client computing device by a user of the client computing device;
   generating a query based upon the textual input;
   providing the query to a search engine that is in communication with the generative model;
   receiving a portion of a webpage identified by the search engine as being relevant to the query generated by the generative model;

generating output based upon a prompt, where the prompt includes the portion of the webpage and the textual input received from the client computing device; and transmitting the output to the client computing device for presentment to the user;

subsequent to transmitting the output to the client computing device, receiving a second input set forth by the user of the client computing device;

generating a second query based upon the textual input, the query, and the second input;

providing the second query to the search engine;

obtaining, from the search engine, content identified by the search engine, where the search engine identified the content based upon the second query;

generating a second output based upon the portion of the webpage identified by the search engine and the content identified by the search engine; and transmitting the second output to the client computing device for presentment to the user.

14. The method of claim 13, where the portion of the webpage is received due to the webpage being amongst the three highest ranked webpages by the search engine based upon the query.

15. The method of claim 13, further comprising receiving an instant answer identified by the search engine as being relevant to the query, where the prompt includes the instant answer.

16. The method of claim 13, further comprising receiving information from an entity card identified by the search engine as being relevant to the query, where the prompt includes the information extracted from the entity card.

17. The method of claim 13, wherein the output includes a citation to the webpage.

18. The method of claim 13, where the output includes an image generated by the generative model.

19. A computer-readable storage medium comprising instructions that, when executed by a processor, cause the processor to perform acts comprising:

receiving, at a generative model and from a client computing device that is presenting content by way of a computer-executable application:

input received by the client computing device from a user of the client computing device; and the content presented by way of the computer-executable application;

in response to receiving the input and the content, generating output based upon a prompt, where the prompt includes the input and the content; and transmitting the output to the client computing device for presentment to the user by way of the computer-executable application;

subsequent to transmitting the output to the client computing device, receiving second input set forth by the user of the client computing device;

generating a second query based upon the input, the query, and the second input;

providing the second query to the search engine;

obtaining, from the search engine, content identified by the search engine, where the search engine identified the content based upon the second query;

generating a second output based upon the portion of the webpage identified by the search engine and the content identified by the search engine; and transmitting the second output to the client computing device for presentment to the user.

* * * * *